United States Patent
Jin et al.

(10) Patent No.: US 11,483,896 B2
(45) Date of Patent: Oct. 25, 2022

(54) METHOD AND DEVICE FOR PERFORMING CELL RESELECTION IN MOBILE COMMUNICATION SYSTEM

(71) Applicant: Samsung Electronics Co., Ltd., Suwon-si (KR)

(72) Inventors: Seungri Jin, Suwon-si (KR); Sangbum Kim, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/966,689

(22) PCT Filed: Feb. 13, 2019

(86) PCT No.: PCT/KR2019/001763
§ 371 (c)(1),
(2) Date: Jul. 31, 2020

(87) PCT Pub. No.: WO2019/160327
PCT Pub. Date: Aug. 22, 2019

(65) Prior Publication Data
US 2021/0037595 A1    Feb. 4, 2021

(30) Foreign Application Priority Data

Feb. 13, 2018 (KR) .................. 10-2018-0018073

(51) Int. Cl.
*H04W 76/27* (2018.01)
*H04W 80/02* (2009.01)
(Continued)

(52) U.S. Cl.
CPC .......... *H04W 80/02* (2013.01); *H04W 36/08* (2013.01); *H04W 48/08* (2013.01); *H04W 76/27* (2018.02); *H04W 80/08* (2013.01)

(58) Field of Classification Search
CPC ..... H04W 80/02; H04W 76/27; H04W 36/08; H04W 48/08; H04W 80/08; H04W 76/15;
(Continued)

(56) References Cited

U.S. PATENT DOCUMENTS

2017/0195464 A1* 7/2017 Lee .................. H04W 52/365
2018/0368132 A1* 12/2018 Babaei ................ H04L 1/1819
(Continued)

FOREIGN PATENT DOCUMENTS

KR    10-2019-0019000 A    2/2019

OTHER PUBLICATIONS

Samsung (Samsung. Discussion on CA duplication. R2-1713830. 3GPP TSG RAN WG2 Meeting #100. Nov. 2017).*
(Continued)

*Primary Examiner* — Lakeram Jangbahadur
(74) *Attorney, Agent, or Firm* — Jefferson IP Law, LLP

(57) ABSTRACT

An operating method of a user equipment in a wireless communication system according to an embodiment of the present disclosure includes receiving a packet duplication configuration and a logical channel restriction configuration (allowedServingCells) for a data radio bearer (DRB) from a base station through an RRC message; receiving an indication to deactivate packet duplication for the DRB, for which packet duplication is configured, from the base station through a media access control (MAC) control element (CE); and not applying the logical channel restriction configuration for the DRB, for which packet duplication is configured, based on the indication to deactivate the packet duplication.

4 Claims, 18 Drawing Sheets

(51) Int. Cl.
H04W 36/08 (2009.01)
H04W 48/08 (2009.01)
H04W 80/08 (2009.01)

(58) Field of Classification Search
CPC ...... H04W 48/12; H04W 76/16; H04L 5/001; H04L 5/0053; H04L 5/0094
See application file for complete search history.

(56) References Cited

U.S. PATENT DOCUMENTS

| 2019/0058550 | A1 | 2/2019 | Kim | |
|---|---|---|---|---|
| 2020/0205050 | A1* | 6/2020 | Shah | H04W 36/0058 |
| 2020/0374752 | A1* | 11/2020 | Xiao | H04W 28/06 |
| 2020/0374955 | A1* | 11/2020 | Dudda | H04L 1/08 |

OTHER PUBLICATIONS

Huawei (3GPP TSG RAN WG2 #100 Meeting, PBR configuration for duplication DRB, R2-1712732, Dec. 2017).*
3GPP (3GPP TS38.321V2.0.0, Medium Access Control (MAC) protocol specification, Dec. 2017).*
Huawei et al., 'PBR configuration for duplication DRB', R2-1712732, 3GPP TSG RAN WG2 Meeting #100, Reno, USA, Nov. 17, 2017.
'3GPP; TSG RAN; NR; MAC protocol specification (Release 15)', 3GPP TS 38.321 V2.0.0, Dec. 11, 2017.
Samsung, 'Discussion on CA duplication', R2-1713830, 3GPP TSG RAN WG2 Meeting #100, Reno, USA, Nov. 17, 2017.
CATT, 'Duplication activation/deactivation MAC CE', R2-1712859, 3GPP TSG RAN WG2 Meeting #100, Reno, USA, Nov. 17, 2017.
International Search Report and Written Opinion dated May 30, 2019, issued in International Patent Application No. PCT/KR2019/001763.
Deutsche Telekom et al., "Need for idle mode distribution with LTE-A carrier aggregation", 3GPP TSG RAN, WG2, Meeting #71 bis, R2-105383, Oct. 5, 2010.
Korean Office Action dated Jul. 19, 2021, issued in Korean Patent Application No. 10-2018-0018073.

* cited by examiner

METHOD AND DEVICE FOR PERFORMING CELL RESELECTION IN MOBILE COMMUNICATION SYSTEM

TECHNICAL FIELD

The present disclosure relates to a mobile communication system, and a method and device for performing cell reselection in a mobile communication system.

BACKGROUND ART

To meet the increasing demand with respect to wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post long-term evolution (post-LTE)' systems. To achieve high data rates, implementation of 5G communication systems in an ultra-high frequency ((millimeter-wave (mm-Wave)) band (e.g., 60 GHz band) is being considered. To reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied. To improve system networks, for 5G communication systems, various technologies such as evolved small cells, advanced small cells, cloud radio access networks (cloud-RAN), ultra-dense networks, device-to-device (D2D) communication, wireless backhaul, moving networks, cooperative communication, coordinated multi-points (CoMP), and interference cancellation have been developed. In addition, for 5G communication systems, advanced coding modulation (ACM) technologies, such as hybrid frequency-shift keying (FSK) and quadrature amplitude modulation (QAM) (FQAM) and sliding window superposition coding (SWSC), and advanced access technologies, such as filter bank multi-carrier (FBMC), non-orthogonal multiple access (NOMA), and sparse code multiple access (SCMA), have been developed.

The Internet has evolved from a human-based connection network whereby humans create and consume information to the Internet of things (IoT) whereby distributed elements such as objects exchange information with each other to process the information. Internet-of-Everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required. In recent years, technologies related to sensor networks for connecting objects, machine-to-machine (M2M) communication, and machine-type communication (MTC) have been studied. In an IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies such as sensor networks, M2M communication, and MTC are being implemented by using 5G communication technology such as beamforming, MIMO, or array antennas. Application of a cloud RAN as the above-described big data processing technology may be an example of convergence of 5G communication technology and IoT technology.

A variety of services can be provided due to the development of wireless communication systems as described above, and thus, a method of smoothly providing such services is required.

DESCRIPTION OF EMBODIMENTS

Solution to Problem

An operating method of a user equipment in a wireless communication system according to an embodiment includes receiving a packet duplication configuration and a logical channel restriction configuration (allowedServingCells) for a data radio bearer (DRB) from a base station through an RRC message; receiving an indication to deactivate packet duplication for the DRB, for which packet duplication is configured, from the base station through a media access control (MAC) control element (CE); and not applying the logical channel restriction configuration for the DRB, for which packet duplication is configured, based on the indication to deactivate packet duplication.

Advantageous Effects of Disclosure

According to embodiments set forth herein, services can be effectively provided in a wireless communication system.

BEST MODE

Figure 1:
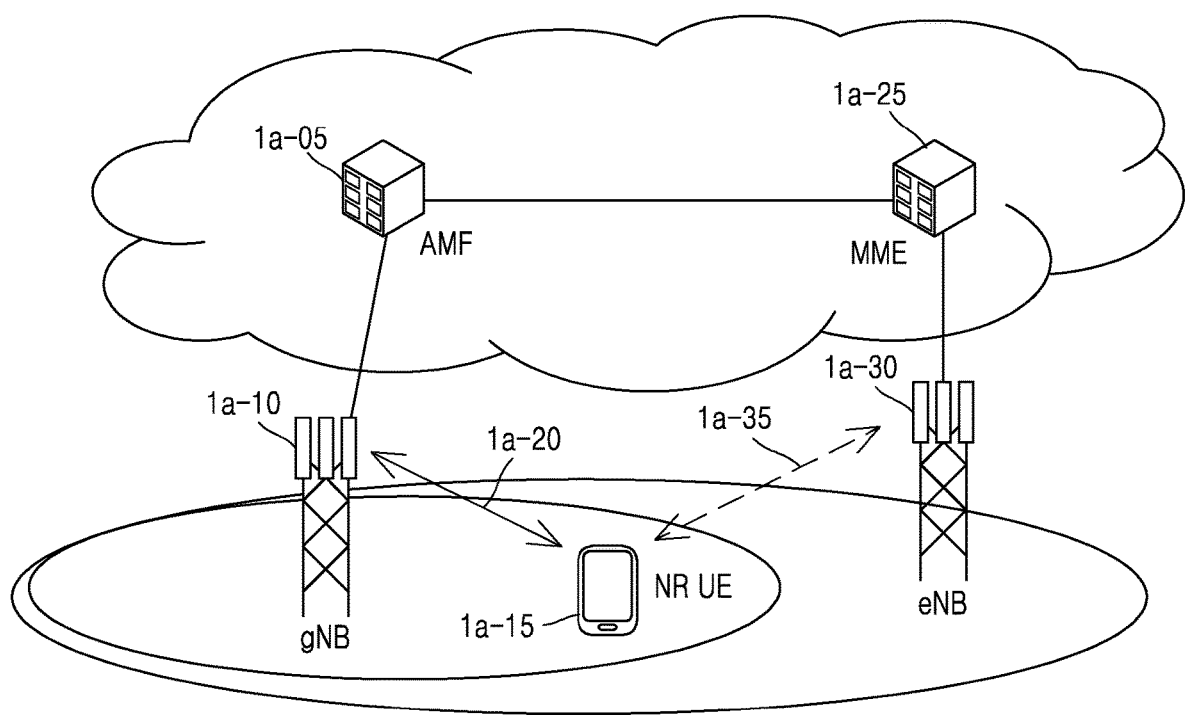
FIG. 1 is a diagram illustrating a structure of a next-generation mobile communication system to which an embodiment is applied.

An operating method of a user equipment in a wireless communication system according to an embodiment includes receiving a packet duplication configuration and a logical channel restriction configuration (allowedServingCells) for a data radio bearer (DRB) from a base station through an RRC message; receiving an indication to deactivate packet duplication for the DRB, for which packet duplication is configured, from the base station through a media access control (MAC) control element (CE); and not applying the logical channel restriction configuration for the DRB, for which packet duplication is configured, based on the indication to deactivate the packet duplication.

In an embodiment, the operation method may further include receiving an indication to activate packet duplication for the DRB, for which packet duplication is configured, from the base station through the MAC CE; and transmitting an original packet and a duplicated packet to the base station according to the logical channel restriction configuration by performing packet duplication on the DRB for which packet duplication is configured.

In an embodiment, the operation method may further include receiving a split bearer configuration from the base station through the RRC message. The transmitting of the original packet and the duplicated packet to the base station according to the logical channel restriction configuration by performing packet duplication on the DRB for which packet duplication is configured may include configuring one packet data convergence protocol (PDCP) entity and two radio link control (RLC) entities for the DRB, for which packet duplication is configured, according to the split bearer configuration; and transmitting the original packet to one of the two RLC entities and the duplicated packet to the other RLC entity.

In an embodiment, the two RLC entities may process different logical channels.

In an embodiment, the operation method may further include receiving a packet duplication configuration (PDCP-CADuplication configuration) for carrier aggregation from the base station through the RRC message.

An operation method of a base station in a wireless communication system according to an embodiment includes transmitting a packet duplication configuration and a logical channel restriction configuration (allowedServingCells) for a data radio bearer (DRB) to a user equipment through a radio resource control (RRC) message; transmitting an indication to deactivate packet duplication for the DRB, for which packet duplication is configured, to the user equipment through a media access control (MAC) control element (CE), and not applying the logical channel restriction configuration for the DRB for which packet duplication is configured.

In an embodiment, the operation method may further include transmitting an indication to activate packet duplication for the DRB, for which packet duplication is configured, to the user equipment through the MAC CE; and receiving an original packet and a duplicated packet with respect to the DRB, for which packet duplication is configured, from the user equipment according to the logical channel restriction configuration.

In an embodiment, the operation method may further include transmitting a split bearer configuration to the user equipment through the RRC message. The receiving of the original packet and the duplicated packet with respect to the DRB, for which packet duplication is configured, from the user equipment according to the logical channel restriction configuration may include configuring one packet data convergence protocol (PDCP) entity and two radio link control (RLC) entities for the DRB, for which packet duplication is configured, according to the split bearer configuration; and receiving an original packet from one of the two RLC entities and the duplicated packet from the other RLC entity.

In an embodiment, the two RLC entities may process different logical channels.

In an embodiment, the operation method may further include transmitting a packet duplication configuration for carrier aggregation to the user equipment through the RRC message.

A user equipment in a wireless communication system according to an embodiment includes a transceiver, and at least one controller combined with the transceiver and configured to control receiving of a packet duplication configuration and a logical channel restriction configuration for a data radio bearer (DRB) from a base station through a radio resource control (RRC) message, receiving of an indication to deactivate packet duplication for the DRB, for which packet duplication is configured, from the base station through a media access control (MAC) control element (CE), and not applying of the logical channel restriction configuration for the DRB, for which packet duplication is configured, based on the indication to deactivate packet duplication.

In an embodiment, the at least one controller may be further configured to control receiving of an indication to activate packet duplication for the DRB, for which packet duplication is configured, from the base station through the MAC CE, and transmitting of an original packet and a duplicated packet to the base station according to the logical channel restriction configuration by performing packet duplication on the DRB for which packet duplication is configured.

In an embodiment, the at least one controller may be further configured to control receiving of a split bearer configuration from the base station through the RRC message, configuring of one packet data convergence protocol (PDCP) entity and two radio link control (RLC) entities for the DRB, for which packet duplication is configured, according to the split bearer configuration, and transmitting of the original packet to one of the two RLC entities and the duplicated packet to the other RLC entity.

In an embodiment, the two RLC entities may process different logical channels.

In an embodiment, the at least one controller may be further configured to control receiving of a packet duplication configuration for carrier aggregation from the base station through the RRC message.

A base station in a wireless communication system according to an embodiment includes a transceiver, and at least one controller combined with the transceiver and configured to control transmitting of a packet duplication configuration and a logical channel restriction configuration for a data radio bearer (DRB) from a user equipment through a radio resource control (RRC) message, transmitting of an indication to deactivate packet duplication for the DRB, for which packet duplication is configured, to the user terminal through a media access control (MAC) control element (CE), and not applying of the logical channel restriction configuration for the DRB, for which packet duplication is configured.

In an embodiment, the at least one controller may be further configured to transmit an indication to activate packet duplication for the DRB, for which packet duplication is configured, to the user equipment through the MAC CE; and receive an original packet and a duplicated packet with respect to the DRB, for which packet duplication is configured, from the user equipment according to the logical channel restriction configuration.

In an embodiment, the at least one controller may be further configured to control transmitting of a split bearer configuration to the user equipment through the RRC message, configuring of one packet data convergence protocol (PDCP) entity and two radio link control (RLC) entities for the DRB, for which packet duplication is configured, according to the split bearer configuration, and receiving of the original packet from one of the two RLC entities and the duplicated packet from the other RLC entity.

In an embodiment, the two RLC entities may process different logical channels.

In an embodiment, the at least one controller may be further configured to control transmitting of a packet duplication configuration for carrier aggregation to the user terminal through the RRC message.

MODE OF DISCLOSURE

Hereinafter, embodiments of the present disclosure will be described in detail with reference to the accompanying drawings.

When embodiments are described herein, a description of techniques which are well known in the technical field to which the present disclosure pertains and are not directly related to the present disclosure will be omitted. This is to more clearly convey the gist of the present disclosure by omitting unnecessary description.

For the same reason, some components are exaggerated, omitted, or schematically illustrated in the accompanying drawings. The size of each component does not entirely reflect the actual size thereof. The same reference numbers are assigned to the same or corresponding elements in each drawing.

Advantages and features of the present disclosure and methods of achieving them will be apparent from embodiments described in detail, in conjunction with the accompanying drawings. However, the present disclosure is not limited to the embodiments below and may be embodied in many different forms. Rather, these embodiments are provided so that this disclosure will be thorough and complete and will fully convey the concept of the present disclosure to those of ordinary skill in the art. The present disclosure should be defined by the scope of the claims. The same reference numerals refer to the same components throughout the specification.

In this case, it will be understood that each block of process flowcharts and combinations of the flowcharts may be performed by computer program instructions. The computer program instructions may be installed in a processor of a general-purpose computer, special-purpose computer, or other programmable data processing equipment, so that means to perform functions described in blocks of each flowchart may be produced by instructions executed by the processor of the computer or the other programmable data processing equipment. The computer program instructions may be stored in a computer usable or readable memory oriented to a computer or other programmable data processing equipment to implement functions in a particular way. Thus, an article of manufacture, including an instruction means for performing the function described in a block (or blocks) of each flowchart, may be produced by the instructions stored in the computer usable or readable memory. Because the computer program instructions may be stored in a computer or other programmable data processing equipment, the functions of the blocks of each flowchart may be provided by the instructions performing a series of operations in the computer or the other programmable data processing equipment to produce a process executable by the computer to generate a computer programmable instructions to operate the computer or the other data processing equipment.

In addition, each block may represent a module, segment, or part of code that includes one or more executable instructions for executing specified logical function(s). It should be noted that in some alternative embodiments, the functions described in the blocks may be performed in an order different from that described herein. For example, two blocks illustrated consecutively may be performed substantially simultaneously or performed in a reverse order according to functions corresponding thereto in some cases.

In this case, the term "unit" used in embodiments set forth herein refers to a software or a hardware component, such as a field programmable gate array (FPGA) or an application-specific integrated circuit (ASIC), which performs certain functions. However, the term "unit" is not limited to software or hardware. The term "unit" may be configured to be stored in an addressable storage medium or to reproduce one or more processors. Thus, the term "unit" may include, for example, components, such as software components, object-oriented software components, class components, and task components, processes, functions, attributes, procedures, subroutines, segments of program code, drivers, firmware, microcode, a circuit, data, database, data structures, tables, arrays, and parameters. Components and functions provided in "units" may be combined to a smaller number of components and "units" or may be divided into sub-components and "sub-units". In addition, the components and "units" may be implemented to execute one or more CPUs in a device or a secure multimedia card. In an embodiment, a "unit" may include one or more processors.

As used herein, terms used to identify a connection node, terms referring to network entities, terms referring to messages, a term referring to interface between network entities, terms referring to various types of identification information, and the like are examples provided for convenience of explanation. Accordingly, the present disclosure is not limited to terms described below, and other terms indicating objects having equivalent technical meanings may be used.

In the following description, terms and names defined in the $3^{rd}$ generation partnership project long term evolution (3GPP LTE) standards or terms and names modified based on them may be used for convenience of explanation. However, the present disclosure is not limited by the terms and names and is equally applicable to systems conforming to other standards.

FIG. 1 is a diagram illustrating a structure of a next-generation mobile communication system.

Referring to FIG. 1, a radio access network of a next-generation mobile communication system (new radio (NR)) includes a new radio node B (hereinafter referred to as gNB) 1a-10 and a new radio core network (AMF) 1a-05. A user equipment (new radio user equipment) (hereinafter referred to as NR UE or UE) 1a-15 is connected to an external network through the gNB 1a-10 and the AMF 1a-05.

In FIG. 1, the gNB 1a-10 corresponds to an evolved node B (eNB) 1a-30 of an existing LTE system. The gNB 1a-10 is connected to the NR UE 1a-15 through a wireless channel and may provide better services than an existing Node B (1a-20). In the next-generation mobile communication system, because all user traffic is serviced through a shared channel, a device for scheduling by collecting status information, such as a buffer state, an available transmission power state, and a channel state of UEs, is needed and the gNB 1a-10 performs this function of the device. Generally, one gNB 1a-10 controls a plurality of cells. In order to implement ultra-high-speed data transmission compared to the existing LTE, a bandwidth may be set to an existing maximum bandwidth or more and beamforming technology may additionally combined with orthogonal frequency division multiplexing (hereinafter referred to as OFDM) as wireless access technology. In addition, an adaptive modulation & coding (hereinafter referred to as AMC) scheme of determining a modulation scheme and a channel coding rate according to a channel state of a UE is applied. The AMF 1a-05 performs functions such as mobility support, bearer configuration, and QoS configuration. The AMF 1a-05 is a device that performs various control functions as well as UE mobility management and is connected to a plurality of base stations. In addition, the next-generation mobile communication system may be linked to the existing LTE system, and the AMF 1a-05 is connected to a mobility management entity (MME) 1a-25 through a network interface. The MME 1a-25 is connected to the eNB 1a-30 which is an existing base station. A UE supporting LTE-NR dual connectivity may transmit and receive data while maintaining a connection to the eNB 1a-30, as well as the gNB 1a-10 (1a-35).

Figure 2:
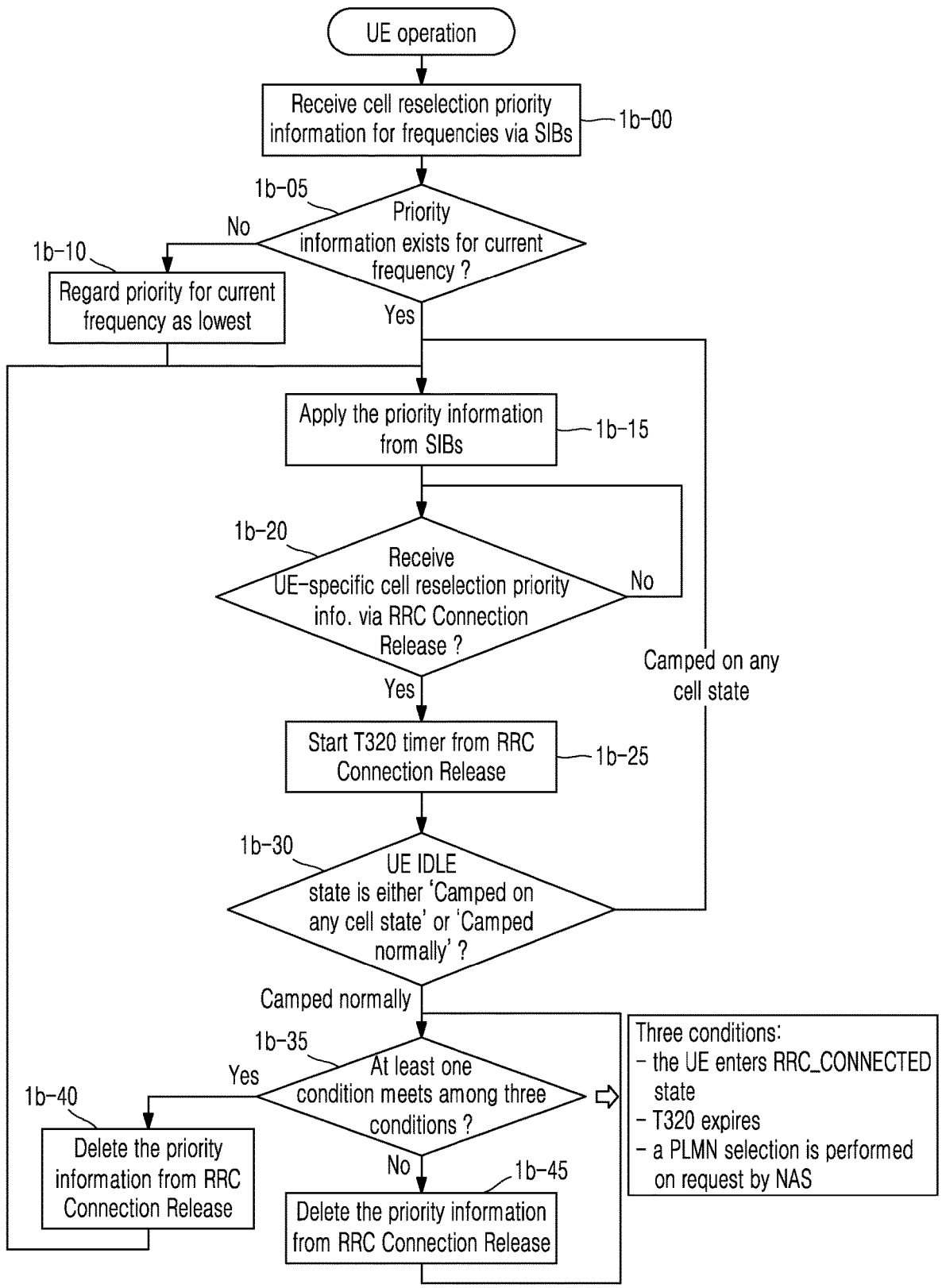
FIG. 2 is a flowchart of a process of broadcasting priority information for each frequency for cell reselection through a system information block (SIB) or applying the priority information to a certain user equipment (UE) through a dedicated radio resource control (RRC) message, according to an embodiment.

FIG. 2 is a flowchart of a process of broadcasting priority information for each frequency for cell reselection through a system information block (SIB) or applying the priority information to a certain UE through a dedicated radio resource control (RRC) message, according to an embodiment.

Cell reselection is a process of reselecting a serving cell so that a moving ME may be connected to a cell having a best channel state. A network gives priority to each frequency so as to control cell reselection for UEs which are in an idle mode. For example, when one UE receives priority information for two frequencies f1 and f2 and the frequency f1 has higher priority than the frequency f2, a probability that the UE stays at the frequency f1 increases. Even when the UE is at the frequency f2, the UE may try to change to the frequency f1 when a channel state of the frequency f2 is not good. Priority information for a frequency is broadcast through a system information block (SIB) or is provided to a certain UE through an RRC connection release message which is dedicated RRC signaling. In an embodiment, priority information provided through an SIB is referred to as common cell reselection priority information, and information provided through a dedicated RRC message is referred to as dedicated cell reselection priority information.

Even when a UE already has priority information for frequencies through the SIB, the priority information provided through the SIB is ignored when UE-specific priority information is provided by RRC signaling. Priority information of each frequency is transmitted by a cellReselectionPriority information element (IE), and one of a total of eight levels of priority is given. Frequencies between radio access technologies (RATs) cannot be given the same priority. When an idle mode state of a UE is 'camped on any cell state', frequency priority information received through the SIB is applied, and priority information received by RRC signaling is stored without being used. The cellReselectionPriority IE is an optional IE and thus may not exist. In this case, priority information is not given to a corresponding frequency. In this case, the UE regards a level of priority given to the corresponding frequency as a lowest level.

In operation 1b-00, the UE receives priority information for frequencies used in other RATs through the SIB, as well as evolved universal terrestrial radio access (E-UTRA). However, priority information is not necessarily provided for all frequencies. Priority information may also not be provided for a frequency of a currently camped-on serving cell. In operation 1b-05, the UE checks whether priority information exists for a current frequency. When priority information for a frequency of a current serving cell is not provided, priority of the frequency is regarded as a lowest level.

In operation 1b-15, the UE applies priority information of each frequency. When receiving an RRC connection release message from a base station, the UE switches from a connected mode to an idle mode. The RRC connection release message may include the priority information of the frequencies. This priority information is UE-specific information and thus is generally applied in preference to frequency priority information provided from the SIB. Therefore, in operation 1b-20, the UE checks whether frequency priority information is included in the RRC connection release message. In operation 1b-25, when frequency priority information is included in the RRC connection release message, a T320 value included together with the frequency priority information is applied to run one timer.

In operation 1b-30, the UE identifies whether a current idle mode state is a 'camped on any cell state' or a 'camped normally state'. The 'camped normally state' refers to a state in which the UE is camping on a suitable cell. The suitable cell is a cell which is capable of providing a normal service to a UE and satisfies the following detailed conditions:
- a cell corresponds to a selected public land mobile network (PLMN), a registered PLMN, or one PLMN in an equivalent PLMN list;
- an unbarred cell;
- a cell that satisfies a cell selection criterion; and
- a cell having corresponding CSG ID in a whitelist of UEs when the cell is a closed subscriber group (CSG) cell.

The term 'camped on any cell state' refers to a state in which a UE cannot camp on a suitable cell and thus is camping on an acceptable cell. In an acceptable cell, general services cannot be provided and only an emergency call may be attempted by a UE. The acceptable cell is a cell that satisfies the following conditions:
- an unbarred cell; and
- a cell that satisfies a cell selection criterion.

When the UE is in the 'camped on any cell state', the process returns to operation 1b-15 to apply frequency priority information provided from the SIB rather than the priority information provided from the RRC connection release message. In operation 1b-35, when the UE is in the 'camped normally state', the UE identifies whether at least one of the following three conditions is satisfied. The three conditions are as follows:
- a UE is switched to a connected mode;
- a T320 timer expires; and
- a PLMN selection process is performed according to a non-access stratum (NAS) request.

In operation 1b-40, when any one of the above conditions is satisfied, the UE discards the priority information provided from the RRC connection release message, returns to operation 1b-15 and applies the frequency priority information provided from the SIB. Otherwise, in operation 1b-45, when any one of the above condition is not satisfied, the UE applies priority information provided from the RRC connection release message.

The frequency priority information affects measurement of a certain frequency by the UE. The UE always performs measurement with respect to a frequency having higher priority than a current serving cell. In contrast, the UE does not always perform measurement with respect to a frequency (intra-frequency) which is the same as that of the serving cell or frequencies having the same priority as or lower priority than that of the serving cell to save power of the UE. Whether to perform measurement may be determined according to whether channel QoS of the serving cell is less than or equal to a certain threshold. Cell reselection is performed to move to a cell having a good channel state but when the channel QoS of the current serving cell is good, there is no reason to move to a frequency having the same priority or lower priority. Therefore, whether to perform measurement may be determined by the threshold to reduce power consumption due to unnecessary channel measurement. In the case of the same frequency (intra-frequency), when the QoS of the serving cell is the same as or lower than a certain threshold Sintrasearch, channel measurement is performed on other cells of the same frequency. For a frequency having the same or lower priority, when the QoS of the serving cell is the same as or lower than a certain threshold Snonintrasearch, channel measurement is performed on cells of the frequency. Generally, RSRP and RSRQ are considered for channel QoS.

While the measurement is performed as described above, when the channel QoS of a cell of a high-priority frequency is higher than a certain threshold ThreshX-high, the UE reselects the cell with the high-priority frequency as a serving cell. When channel QoS of a cell of a low-priority frequency is higher than a certain threshold ThreshX-low and the QoS of a serving cell is lower than a threshold ThreshServing-low, the UE reselects the cell of the low-priority frequency as a serving cell.

Figure 3:
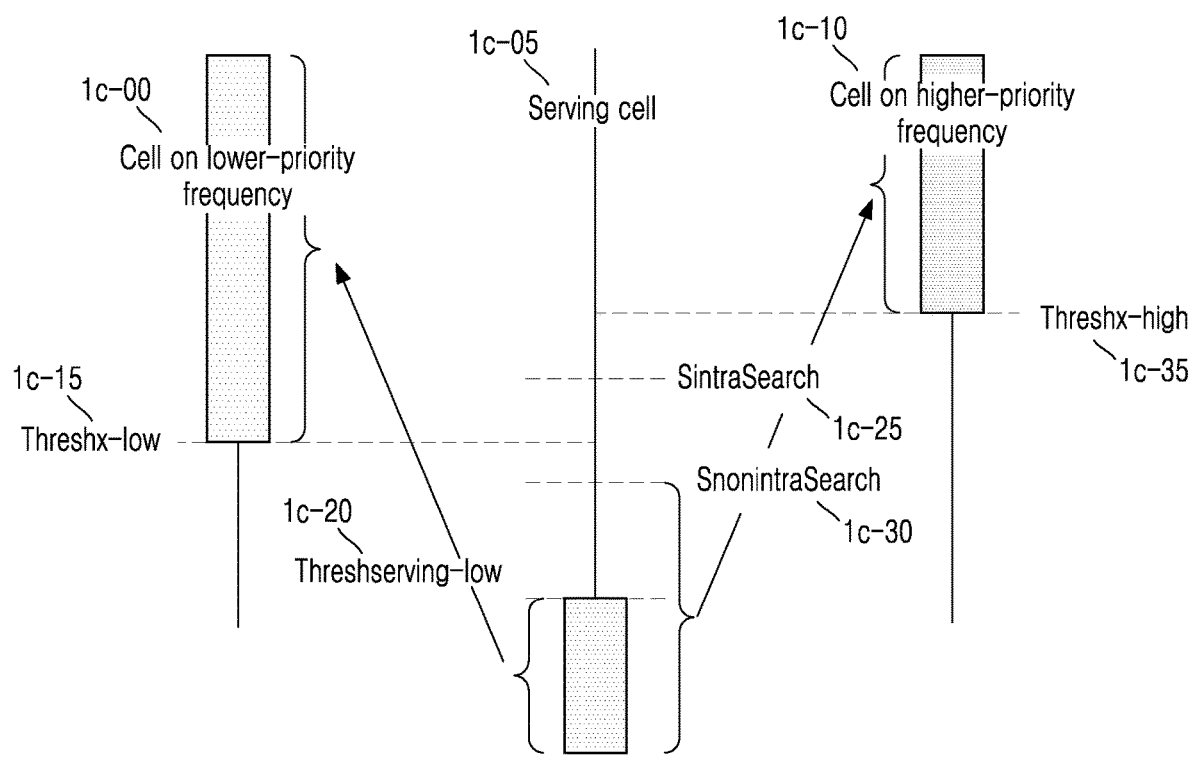
FIG. 3 is a diagram for explaining a method of performing cell reselection by a UE according to signal strength, according to an embodiment.

FIG. 3 is a diagram for explaining a method of performing cell reselection by a UE according to signal strength, according to an embodiment.

The UE always performs inter-freq/RAT measurement for a high-priority frequency or RAT regardless of signal strength measured for a serving cell. When the measured signal strength for the serving cell is lower than a threshold SintraSearch 1c-25, the UE performs intra-freq measurement. When the measured signal strength for the serving cell is lower than a threshold SnonintraSearch 1c-30, the UE performs inter-freq/RAT measurement on a frequency with priority equal to or lower than that of a frequency of a current serving cell. The reason why the measurement by the UE is triggered in stages is to reduce power consumption of the UE due to the measurement of neighboring cells. When channel QoS of a cell 1c-10 of a high-priority frequency is higher than a certain threshold ThreshX-high 1c-35, the UE reselects the cell with the high-priority frequency as a serving cell. When channel QoS of a cell 1c-00 of a low-priority frequency is higher than a certain threshold ThreshX-low 1c-15 and QoS of a serving cell is lower than a threshold ThreshServing-low 1c-20, the UE reselects the cell of the low-priority frequency as a serving cell.

When a cell is reselected, received signal strength RSRP or received signal quality RSRQ may be considered. When the received signal quality, i.e., RSRQ, is used, a base station separately provides Threshserving-lowQ, ThreshX-lowQ, and ThreshX-highQ to the UE by broadcasting. When the received signal strength is used, Threshserving-lowP, ThreshX-lowP, and ThreshX-highP are used in the present disclosure to be distinguished from the above variables.

Figure 4:
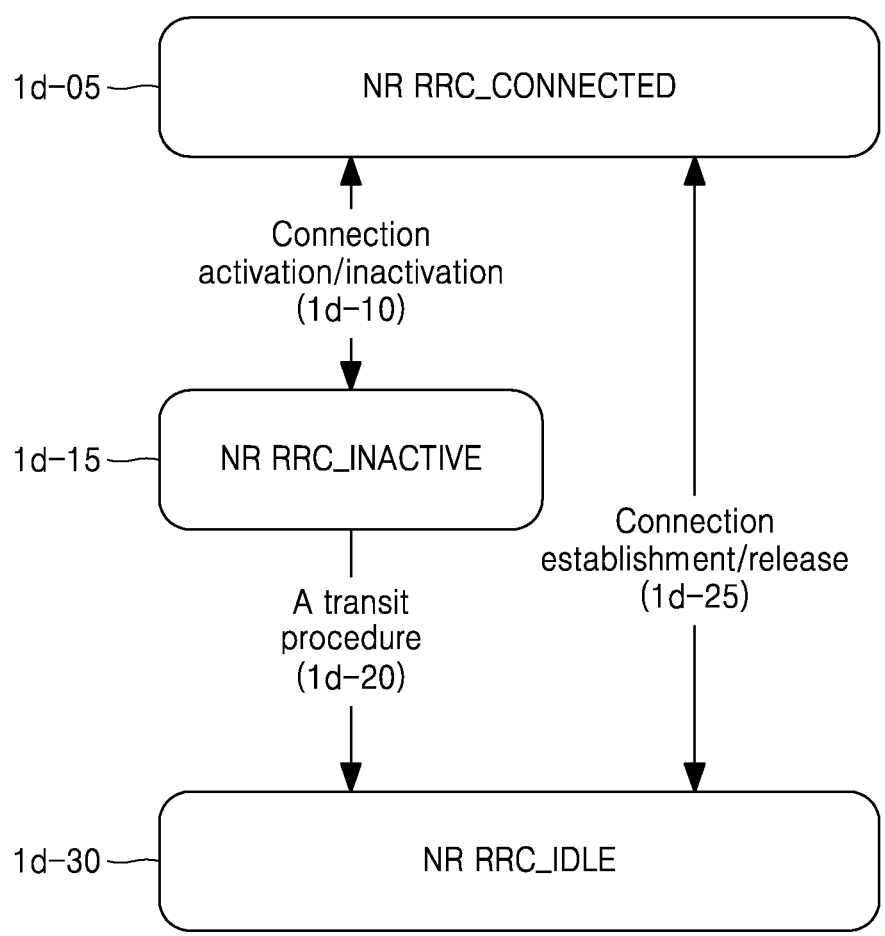
FIG. 4 is a diagram for explaining a change of a wireless connection state in a next-generation mobile communication system to which an embodiment is applied.

FIG. 4 is a diagram for explaining a change of a wireless connection state in a next-generation mobile communication system to which an embodiment is applied.

In the next-generation mobile communication system, there are three radio access states (RRC states). A connection mode RRC_CONNECTED 1d-05 is a wireless connection state in which a UE is capable of transmitting and receiving data. An idle mode RRC_IDLE 1d-30 is a wireless access state in which a UE monitors whether paging is transmitted thereto. The connection mode 1d-05 and the idle mode 1d-30 are radio access states that are also applied to an LTE system, and detailed technology thereof is the same as that of the LTE system. In the next-generation mobile communication system, an inactive mode RRC_INACTIVE 1d-15 is defined as a new radio access state. In the inactive mode 1d-15, UE context is maintained in a base station and the UE and RAN-based paging is supported. Characteristics of the inactive mode 1d-15 which is a radio access state are as follows:
- cell re-selection mobility;
- CN-NR RAN connection (both C/U-planes) has been established for UE;
- the UE AS context is stored in at least one gNB and the UE;
- paging is initiated by NR RAN;
- RAN-based notification area is managed by NR RAN; and
- NR RAN knows the RAN-based notification area which the UE belongs to.

The inactive mode 1d-15, which is a new radio access state, may change to a connected mode or an idle mode according to a certain procedure. The inactive mode 1*d*-15 is switched to the connected mode 1*d*-05 by connection activation, and the connected mode 1*d*-05 is switched to the inactive mode 1*d*-15 by connection inactivation. In the connection activation/inactivation, one or more RRC messages are transmitted and received between the UE and the base station, and the connection activation/inactivation includes one or more operations. Similarly, the inactive mode 1*d*-15 may be switched to the idle mode 1*d*-30 according to a certain procedure 1*d*-20. Various methods such as exchanging a certain message or a timer-based or event-based method may be considered as this procedure. A switch between the connected mode 1*d*-05 and the idle mode 1*d*-30 is subject to LTE technology. That is, switching is performed between the connected mode 1*d*-05 and the idle mode 1*d*-30 through a connection establishment or release procedure 1*d*-25.

Figure 5:
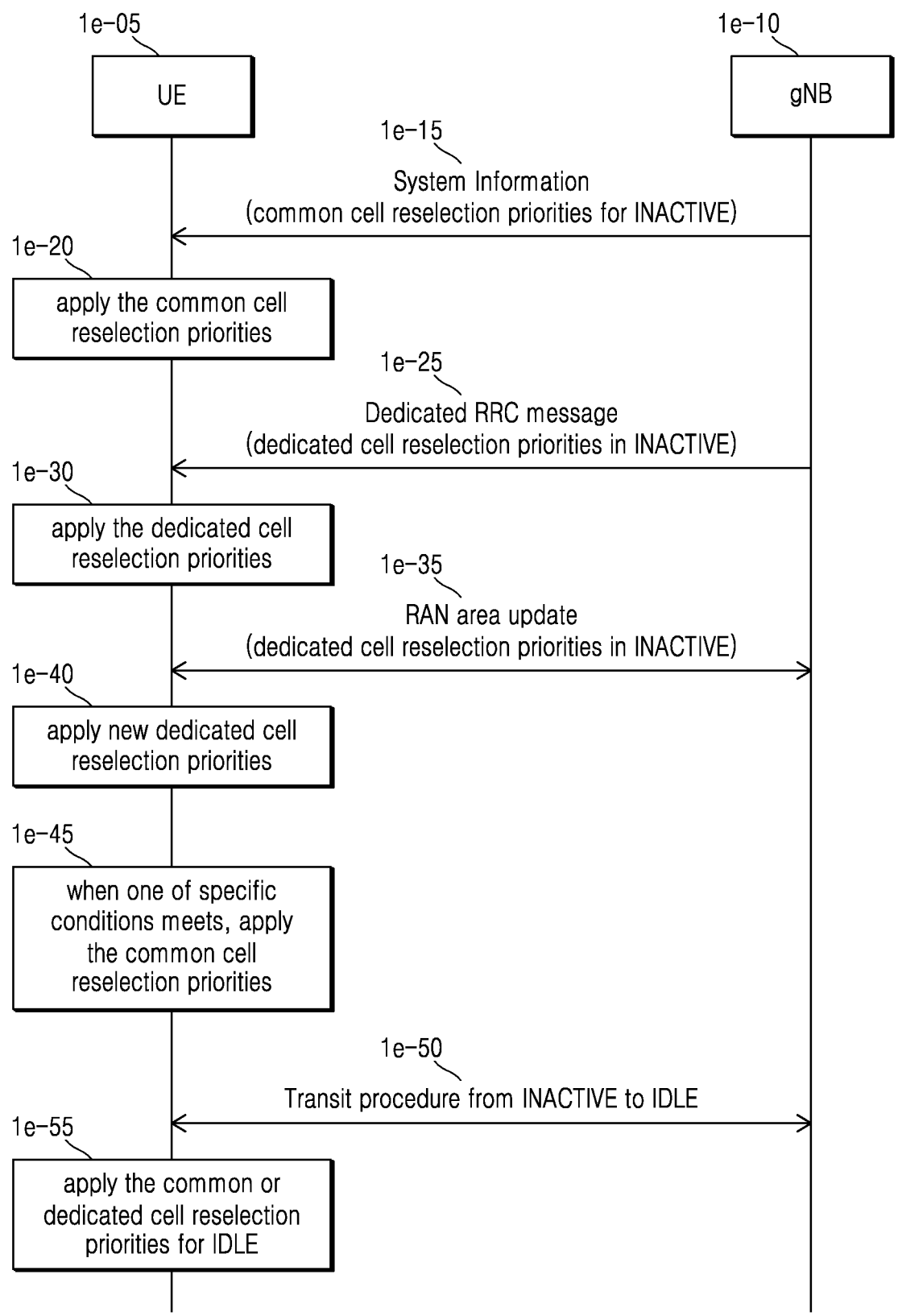
FIG. 5 is a flowchart of a process of applying cell reselection priority information in an inactive state RRC_INACTIVE in a next-generation mobile communication system, according to an embodiment.

FIG. 5 is a flowchart of a process of applying cell reselection priority information in an inactive state RRC_INACTIVE in a next-generation mobile communication system according to an embodiment.

A UE 1*e*-05 receives system information from a gNB 1*e*-10. The system information includes common cell reselection priority information applied in an inactive mode. In order to reduce signaling overhead, the common cell reselection priority information applied in the idle mode may be applied in the inactive mode. The reverse is also possible. When this information is not provided, all frequencies are considered to have the same priority. When a piece of common cell reselection priority information in the system information is applied to both the idle mode and the inactive mode, a 1-bit indicator indicating this fact is included. That is, when the common cell reselection priority information applied to the idle mode or the inactive mode is included in the system information and the 1-bit indicator is also included together with this information, this priority information is also applied to other RRC states. When the indicator is not included or indicates that the priority information is not applied to the two RRC states, it is assumed that all frequencies have the same priority in a cell reselection operation in the RRC state in which no priority information is provided.

The UE 1*e*-05 performs the cell reselection operation by applying common cell reselection priority information corresponding to a current RRC state (1*e*-20). The UE 1*e*-05 receives an RRC message instructing to switch from the connected mode to the inactive mode from the gNB 1*e*-10 (1*e*-25). The RRC message includes dedicated cell reselection priority information applied in the inactive mode. The UE 1*e*-05 applies the cell reselection priority information corresponding to the inactive mode to perform the cell reselection operation (1*e*-30). When the dedicated cell reselection priority information is not provided, the common cell reselection priority information is applied. The dedicated cell reselection priority information may be updated during a RAN area update process (1*e*-35). In the RAN area update process, a certain RRC message instructing the UE 1*e*-05 to switch from the connected mode to the inactive mode includes updated dedicated cell reselection priority information. The UE 1*e*-05 performs the cell reselection operation by applying the updated dedicated cell reselection priority information (1*e*-40). When the updated dedicated cell reselection priority information is not provided, the common cell reselection priority information is applied. When the common cell reselection priority information is not provided from the system information, all frequencies are considered to have the same priority. The UE 1*e*-05 deletes the applied dedicated cell reselection priority information according to certain conditions. After this information is deleted, the UE 1*e*-05 applies the common cell reselection priority information provided from the system information (1*e*-45). When the common cell reselection priority information is not provided from the system information, all frequencies are considered to have the same priority. The conditions are as follows:

when the UE is switched to the connected mode;
when a certain timer expires;
when a PLMN selection operation is initiated from an NAS layer of the UE; and
when the UE is provided with dedicated cell reselection priority information during the RAN area update process.

When the UE 1*e*-05 is switched from the inactive mode to the idle mode through a certain process (1*e*-50), dedicated cell reselection priority information or common cell reselection priority information corresponding to the idle mode is applied (1*e*-55). When both the dedicated cell reselection priority information and the common cell reselection priority information are provided, the dedicated cell reselection priority information is applied.

Figure 6:
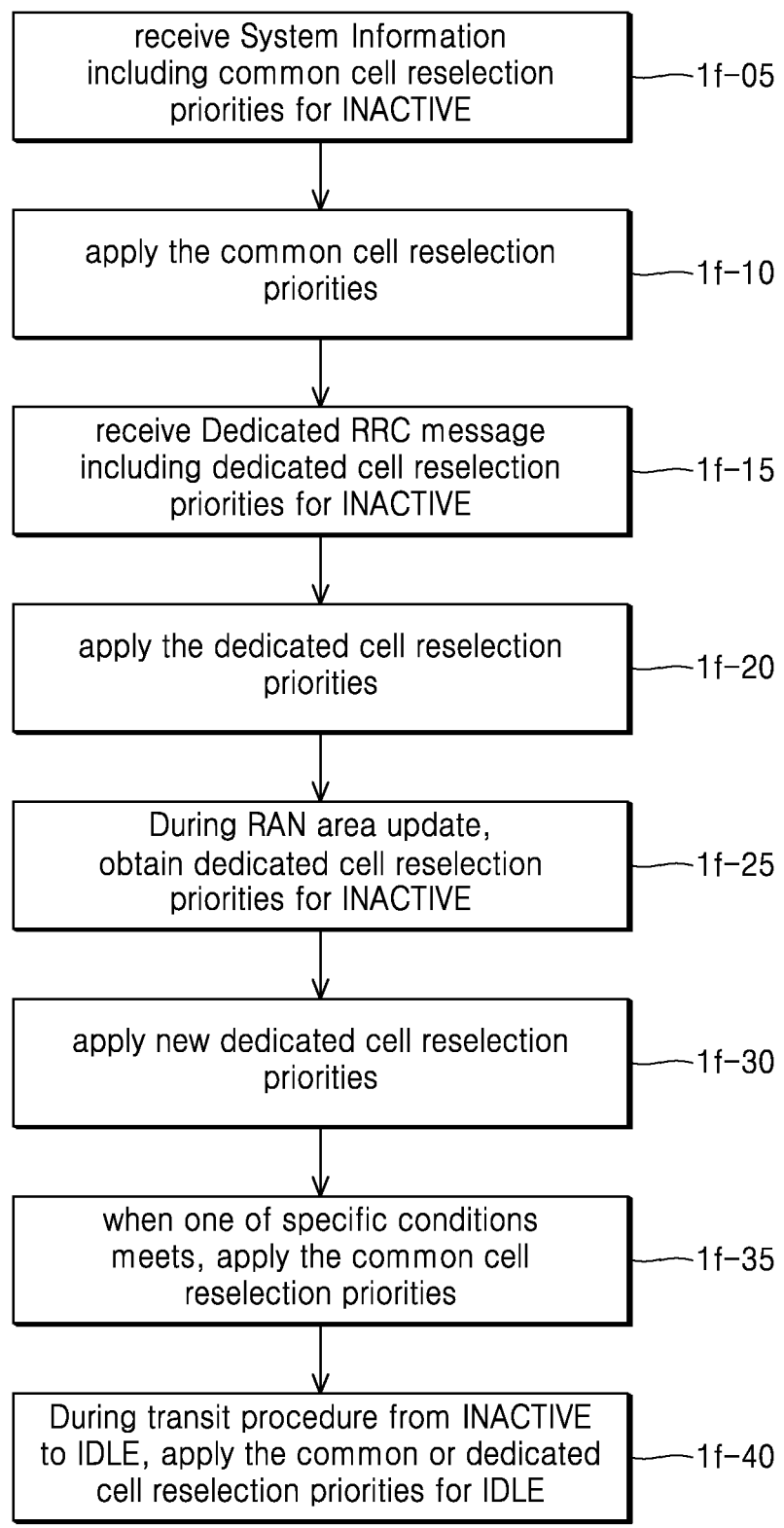
FIG. 6 is a flowchart of applying, by a UE, cell reselection priority information in an inactive state RRC_INACTIVE in a next-generation mobile communication system, according to an embodiment.

FIG. 6 is a flowchart of applying, by a UE, cell reselection priority information in an inactive state RRC_INACTIVE in a next-generation mobile communication system, according to an embodiment.

In operation 1*f*-05, the UE receives system information from a base station. The system information includes common cell reselection priority information applied in the inactive mode.

In operation 1*f*-10, the UE performs a cell reselection operation by applying common cell reselection priority information corresponding to the inactive mode.

In operation 1*f*-15, the UE receives an RRC message instructing to switch from the connected mode to the inactive mode from the base station. The RRC message includes dedicated cell reselection priority information applied in the inactive mode.

In operation 1*f*-20, the UE performs a cell reselection operation by applying dedicated cell reselection priority information corresponding to the inactive mode.

In operation 1*f*-25, a certain RRC message instructing the UE to switch from the connected mode to the inactive mode during a RAN area update process includes updated dedicated cell reselection priority information.

In operation 1*f*-30, the UE performs the cell reselection operation by applying the updated dedicated cell reselection priority information.

In operation 1*f*-35, the UE deletes the applied dedicated cell reselection priority information according to a certain condition. After this information is deleted, the UE performs the cell reselection operation by applying the common cell reselection priority information provided from the system information.

In operation 1*f*-40, when the UE is switched from the inactive mode to the idle mode through a certain process, the cell reselection operation is performed by applying dedicated cell reselection priority information or common cell reselection priority information corresponding to the idle mode.

The difference between the process of applying the cell reselection priority information in the idle mode and the process of applying the cell reselection priority information in the inactive mode is as shown in Table 1 below.

TABLE 1

| | IDLE | INACTIVE |
|---|---|---|
| Assign dedicated cell reselection priorities | Initial assignment: RRC connection release message | Initial assignment: inactive state transition message Update: RESUME message (when RNA is updated) |
| Discard dedicated cell reselection priorities | the UE enters RRC_CONNECTED state; or the optional validity time of dedicated priorities (T320) expires; or PLMN selection is performed on request by NAS | the UE enters RRC_CONNECTED state; or the optional validity time of dedicated priorities (T320) expires; or PLMN selection is performed on request by NAS the UE reselects a cell which is not part of the current RNA |
| Apply common cell reselection priorities | T320 expiry | T320 expiry; Reselecting a cell which is not part of the current RNA |
| deprioritisationReq | RRCConnectionReject | RRCResumeReject |

Figure 7:
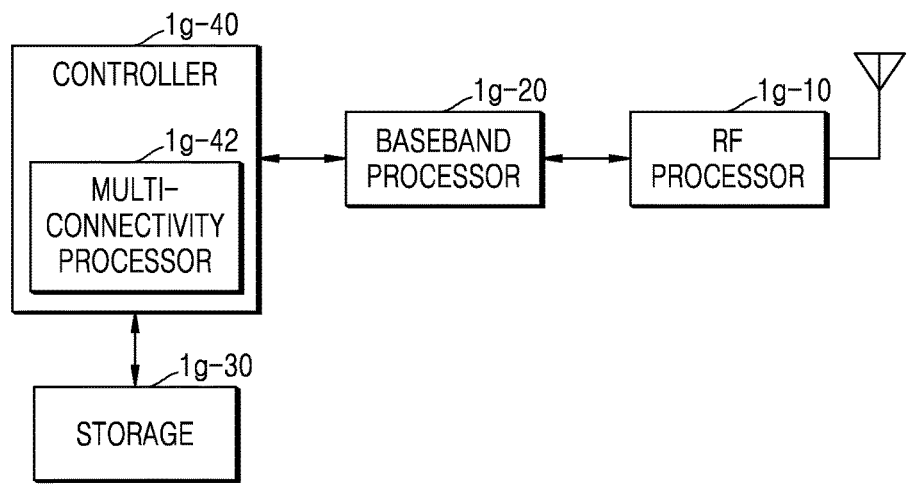
FIG. 7 is a block diagram illustrating a configuration of a UE according to an embodiment.

FIG. 7 is a block diagram illustrating a configuration of a UE according to an embodiment.

Referring to FIG. 7, the UE includes a radio-frequency (RF) processor 1g-10, a baseband processor 1g-20, a storage 1g-30, and a controller 1g-40.

The RF processor 1g-10 performs functions, such as signal-band conversion and amplification, to transmit and receive signals through a wireless channel. That is, the RF processor 1g-10 up-converts a baseband signal provided from the baseband processor 1g-20 into an RF band signal and transmits the RF band signal via an antenna, and down-converts an RF band signal received via the antenna into a baseband signal. For example, the RF processor 1g-10 may include a transmission filter, a reception filter, an amplifier, a mixer, an oscillator, a digital-to-analog convertor (DAC), an analog-to-digital convertor (ADC), and the like. Although only one antenna is shown in FIG. 7, the UE may include a plurality of antennas. The RF processor 1g-10 may include a plurality of RF chains. Furthermore, the RF processor 1g-10 may perform beamforming. For beamforming, the RF processor 1g-10 may adjust a phase and magnitude of each of signals transmitted and received through the plurality of antennas or antenna elements. In addition, the RF processor 1g-10 may perform MIMO and receive multiple layers when MIMO is performed.

The baseband processor 1g-20 performs conversion between a baseband signal and a bits string according to a physical layer standard of the system. For example, for data transmission, the baseband processor 1g-20 generates complex symbols by encoding and modulating a transmission bit string. For data reception, the baseband processor 1g-20 reconstructs a received bit string through demodulation and decoding of a baseband signal provided from the RF processor 1g-10. For example, when an orthogonal frequency division multiplexing (OFDM) scheme is used, for data transmission, the baseband processor 1g-20 generates complex symbols by encoding and modulating a transmission bit string, maps the complex symbols to subcarriers, and constructs OFDM symbols through inverse fast Fourier transform (IFFT) and cyclic prefix (CP) insertion. In addition, for data reception, the baseband processor 1g-20 divides a baseband signal from the RF processor 1g-10 into OFDM symbols, reconstructs signals mapped to subcarriers through fast Fourier transform (FFT), and reconstructs a received bit string by demodulation and decoding.

The baseband processor 1g-20 and the RF processor 1g-10 transmit and receive signals as described above. Accordingly, the baseband processor 1g-20 and the RF processor 1g-10 may be each referred to as a transmitter, a receiver, a transceiver, or a communicator. Furthermore, at least one of the baseband processor 1g-20 and the RF processor 1g-10 may include a plurality of communication modules to support different radio access technologies. In addition, at least one of the baseband processor 1g-20 and the RF processor 1g-10 may include different communication modules to process signals of different frequency bands. For example, different radio access technologies may include a wireless LAN (e.g., IEEE 802.11), a cellular network (e.g., LTE), and the like. In addition, different frequency bands may include a super-high-frequency (SHF) band (e.g., 2.NRHz or NRhz) and a millimeter wave band (e.g., 60 GHz).

The storage 1g-30 stores data such as a basic program, an application program, and configuration information for operation of the UE. In addition, the storage 1g-30 provides the stored data in response to a request from the controller 1g-40.

The controller 1g-40 controls overall operations of the UE. For example, the controller 1g-40 transmits and receives signals through the baseband processor 1g-20 and the RF processor 1g-10. Furthermore, the controller 1g-40 writes data to and reads data from the storage 1g-30. To this end, the controller 1g-40 may include at least one processor. For example, the controller 1g-40 may include a communication processor (CP) for control of communication and an application processor (AP) for control of an upper layer such as an application program.

Figure 8:
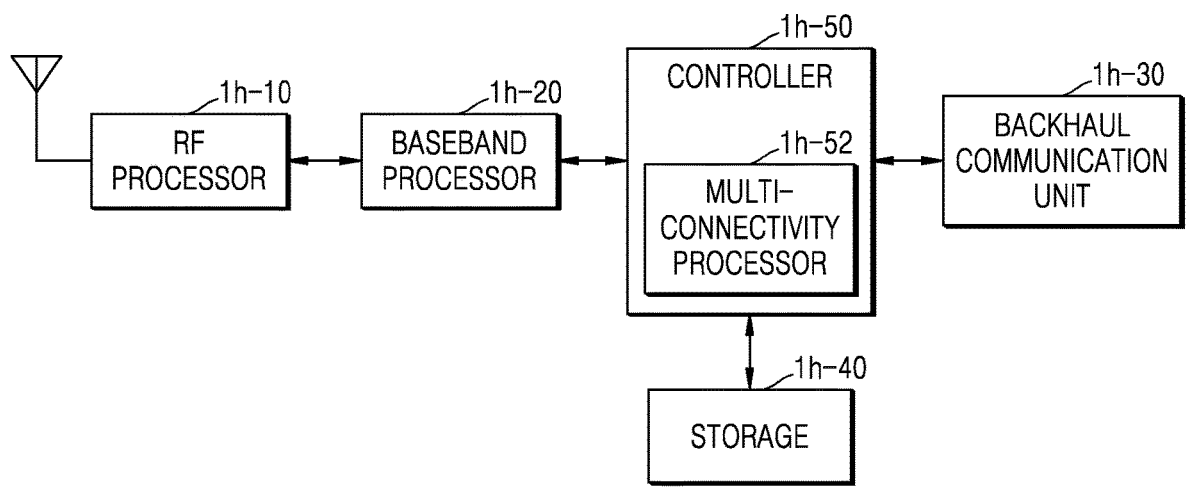
FIG. 8 is a block diagram illustrating a configuration of a base station according to an embodiment.

FIG. 8 is a block diagram illustrating a configuration of a base station according to an embodiment.

As illustrated in FIG. 8, the base station includes an RF processor 1h-10, a baseband processor 1h-20, a backhaul communicator 1h-30, a storage 1h-40, and a controller 1h-50.

The RF processor 1h-10 performs functions, such as signal-band conversion and amplification, to transmit and receive signals through a wireless channel. That is, the RF processor 1h-10 up-converts a baseband signal provided from the baseband processor 1h-20 into an RF band signal and transmits the RF band signal via an antenna, and down-converts an RF band signal received via the antenna into a baseband signal. For example, the RF processor 1h-10 may include a transmission filter, a reception filter, an amplifier, a mixer, an oscillator, a DAC, an ADC, and the like. Although only one antenna is illustrated in FIG. 8, embodiments are not limited thereto and the UE may include a plurality of antennas. The RF processor 1h-10 may include a plurality of RF chains. Furthermore, the RF processor 1h-10 may perform beamforming. For beamforming, the RF processor 1h-10 may adjust a phase and magnitude of each of signals transmitted and received through the plurality of antennas or antenna elements. The RF processor 1h-10 may perform a downlink MIMO operation by transmitting one or more layers.

The baseband processor 1h-20 performs conversion between a baseband signal and a bits string according to a physical layer standard. For example, for data transmission, the baseband processor 1h-20 generates complex symbols by encoding and modulating a transmission bit string. For data reception, the baseband processor 1h-20 reconstructs a received bit string through demodulation and decoding of a baseband signal provided from the RF processor 1h-10. For example, when the OFDM scheme is used, for data transmission, the baseband processor 1h-20 generates complex symbols by encoding and modulating a transmission bit string, maps the complex symbols to subcarriers, and then constructs OFDM symbols through IFFT and CP insertion. In addition, for data reception, the baseband processor 1h-20 divides a baseband signal from the RF processor 1h-10 into OFDM symbols, reconstructs signals mapped to subcarriers through FFT, and reconstructs a received bit string by demodulation and decoding. The baseband processor 1h-20 and the RF processor 1h-10 transmit and receive signals as described above. Accordingly, the baseband processor 1h-20 and the RF processor 1h-10 may be each referred to as a transmitter, a receiver, a transceiver, a communicator, or a wireless communicator.

The backhaul communicator 1h-30 provides an interface for communication with other nodes in a network. That is, the backhaul communicator 1h-30 converts a bit string transmitted from a main base station to another node, e.g., an auxiliary base station or a core network, into a physical signal, and converts a physical signal received from another node into a bit string.

The storage 1h-40 stores data such as a basic program, an application program, and configuration information for operation of the main base station. In particular, the storage 1h-40 may store information about a bearer allocated to a connected UE, measurement results reported from the connected UE, and the like. The storage 1h-40 may further store information serving as a criterion for determining whether to provide dual conductivity to the UE or stop the dual conductivity. In addition, the storage 1h-40 provides the stored data in response to a request from the controller 1h-50.

The controller 1h-50 controls overall operations of the main base station. For example, the controller 1h-50 transmits and receives signals through the baseband processor 1h-20 and the RF processor 1h-10 or through the backhaul communicator 1h-30. Furthermore, the controller 1h-50 writes data to and reads data from the storage 1h-40. To this end, the controller 1h-50 may include at least one processor.

From now on, matters related to packet-duplicated data transmission newly introduced in the next-generation mobile communication system will be described. In an embodiment, a scheduler should allocate transmission resources such that duplicated data is transmitted in different time resources through different carriers or different media access control (MAC) packet data units (PDUs) and all data is not transmitted in one MAC PDU. To this end, a method applied differently when packet duplication is activated or deactivated, that is, transmission allocation to a certain serving cell, should be considered.

In the present disclosure, a method of mapping data duplicated in a packet to different logical channel groups and transmitting a corresponding logical channel group to a certain serving cell so as to transmit the data will be described. According to the present disclosure, the duplicated data may be transmitted in different time resources through different carriers or different MAC PDUs, thereby improving reliability through packet duplication.

Figure 9:
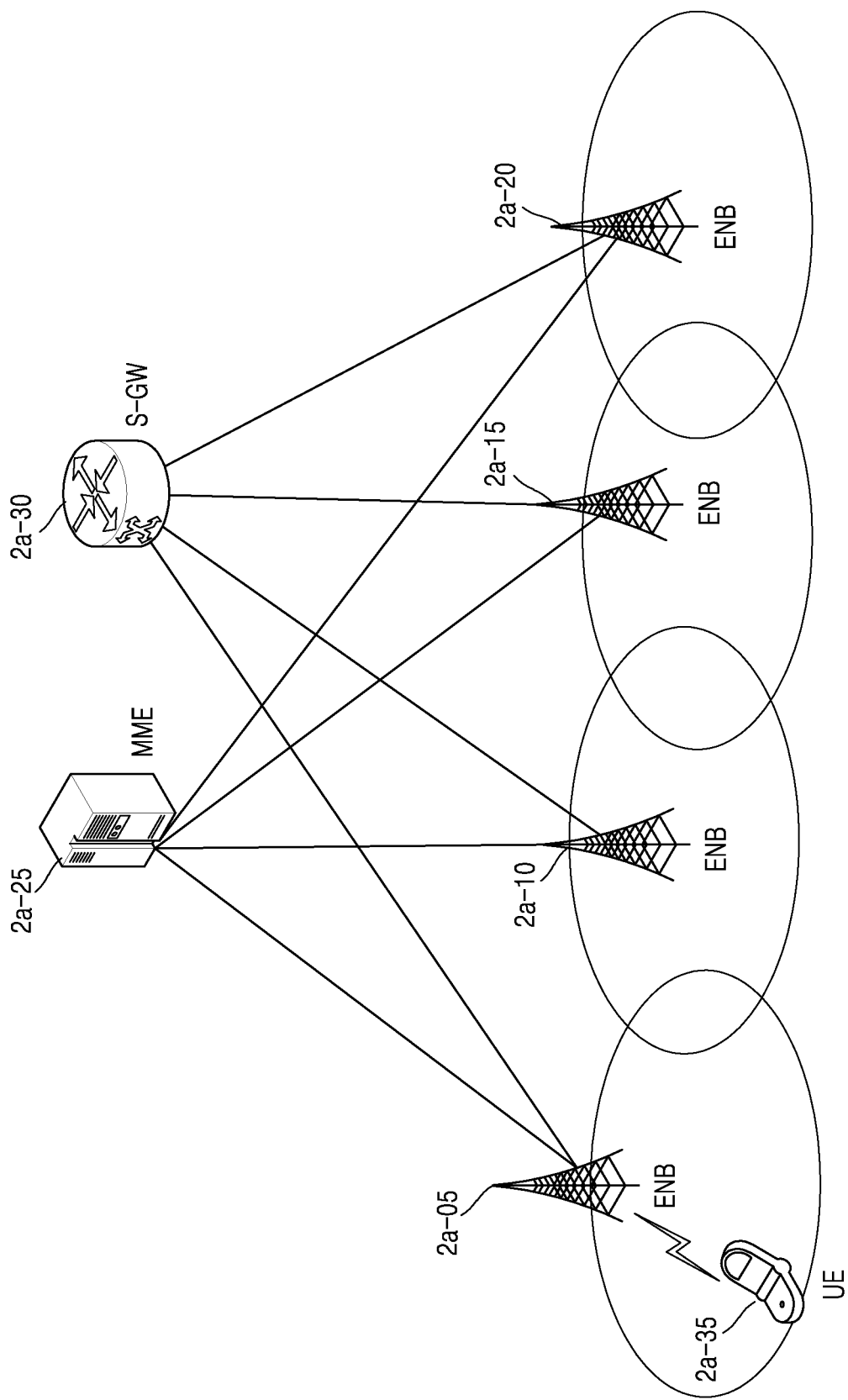
FIG. 9 is a diagram illustrating a configuration of a long-term evolution (LTE) system.

FIG. 9 is a diagram illustrating a configuration of an LTE system.

Referring to FIG. 9, a radio access network of the LTE system includes next-generation base stations (evolved nodes B, hereinafter referred to as eNBs, nodes B or base stations) 2a-05, 2a-10, 2a-15, and 2a-20, a mobility management entity (MME) 2a-25, and a serving-gateway (S-GW) 2a-30. A user equipment (hereinafter referred to as UE) 2a-35 is connected to an external network through the eNBs 2a-05 to 2a-20 and the S-GW 2a-30.

In FIG. 9, the eNBs 2a-05 to 2a-20 provide wireless access as an access nodes of a cellular network to UEs connected to a network, and correspond to existing Nodes B of a UMTS system. An eNB is connected to a UE 2a-35 through a radio channel and performs a more complicated role than an existing Node B. In the LTE system, all user traffic, including real-time services such as Voice over IP (VoIP) through the Internet protocol, are serviced through a shared channel, and thus, a device for perform scheduling by collecting status information such as buffer states of UEs, available transmission power status, channel status, etc. is needed. The eNBs 2a-05 to 2a-20 function as such a device. That is, the eNBs 2a-05 to 2a-20 support a connection between UEs and a core network (CN). Generally, one gNB controls a plurality of cells. For example, in order to realize a transmission rate of 100 Mbps, the LTE system uses, for example, an orthogonal frequency division multiplexing (hereinafter referred to as OFDM) as radio access technology in a 20 MHz bandwidth. In addition, an adaptive modulation & coding (hereinafter referred to as AMC) scheme of determining a modulation scheme and a channel coding rate according to a channel state of a UE is applied. The S-GW 2a-30 is a device that provides a data bearer, and generates or removes a data bearer under control of the MME 2a-25. The MMF 2a-25 is a device that performs various control functions as well as UE mobility management and is connected to a plurality of base stations. The MME 2a-25 and the S-GW 2a-30 may further perform authentication on UEs connected to the network, bearer management, etc. and process packets received from or to be transmitted to the eNBs 2a-05 to 2a-20.

Figure 10:
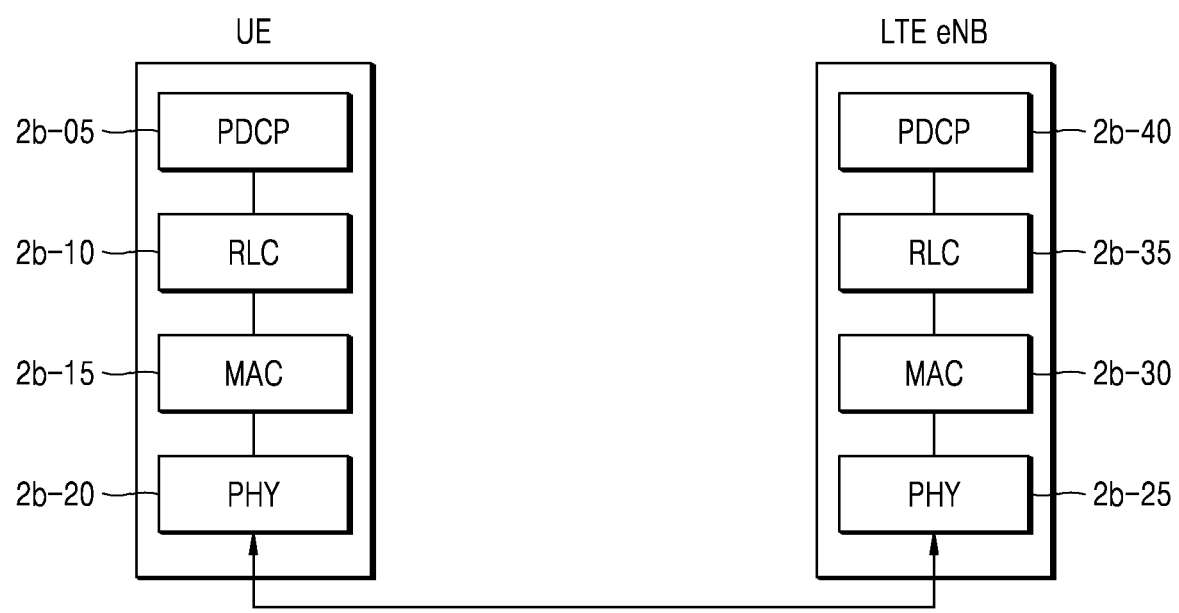
FIG. 10 is a diagram illustrating a radio protocol architecture in an LTE system.

FIG. 10 is a diagram illustrating a radio protocol architecture in an LTE system.

Referring to FIG. 10, radio protocols of the LTE system include Packet Data Convergence Protocols (PDCPs) 2b-05 and 2b-40, Radio Link Controls (RLCs) 2b-10 and 2b-35, and Medium Access Controls (MACs) 2b-15 and 2b-30. The PDCPs 2b-05 and 2b-40 perform IP header compression/reconstruction and the like. Main functions of a PDCP may be summarized as follows:

- header compression and decompression: ROHC only;
- transfer of user data;
- in-sequence delivery of upper layer PDUs at PDCP re-establishment procedure for RLC AM;
- reordering (For split bearers in DC (only support for RLC AM): PDCP PDU routing for transmission and PDCP PDU reordering for reception);
- duplicate detection of lower layer SDUs at PDCP re-establishment procedure for RLC AM;
- retransmission of PDCP SDUs at handover and, for split bearers in DC, of PDCP PDUs at PDCP data-recovery procedure, for RLC AM;
- ciphering and deciphering; and
- timer-based SDU discarding in uplink.

The radio link controls (hereinafter referred to as RLCs) 2b-10 and 2b-35 reconstruct a PDCP packet data unit (PDU) in an appropriate size to perform an ARQ operation and the like. Main functions of an RLC may be summarized as follows:

data transfer function (transfer of upper layer PDUs);
ARQ function (error correction through ARQ (only for AM data transfer));
concatenation, segmentation and reassembly of RLC SDUs (only for UM and AM data transfer);
re-segmentation of RLC data PDUs (only for AM data transfer);
reordering of RLC data PDUs (only for UM and AM data transfer);
duplicate detection (only for UM and AM data transfer);
protocol error detection (only for AM data transfer);
RLC SDU discard (only for UM and AM data transfer); and
RLC re-establishment The MACs 2b-15 and 2b-30 are connected to several RLC layer devices configured in one UE, and multiplex RLC PDUs to MAC PDUs and demultiplex RLC PDUs from MAC PDUs. Main functions of a MAC may be summarized as follows:

mapping between logical channels and transport channels;
multiplexing/demultiplexing of MAC SDUs belonging to one or different logical channels into/from transport blocks (TB) delivered to/from the physical layer on transport channels;
scheduling information reporting;
HARQ function (error correction through HARQ);
priority handling between logical channels of one UE;
priority handling between UEs by means of dynamic scheduling;
MBMS service identification;
transport format selection; and
padding.

Physical layers 2b-20 and 2b-25 channel-code and modulate upper-layer data into an OFDM symbol and transmit the OFDM symbol through a radio channel, and demodulate and channel-decode an OFDM symbol received through the radio channel and transmits resultant data to an upper layer.

Figure 11:
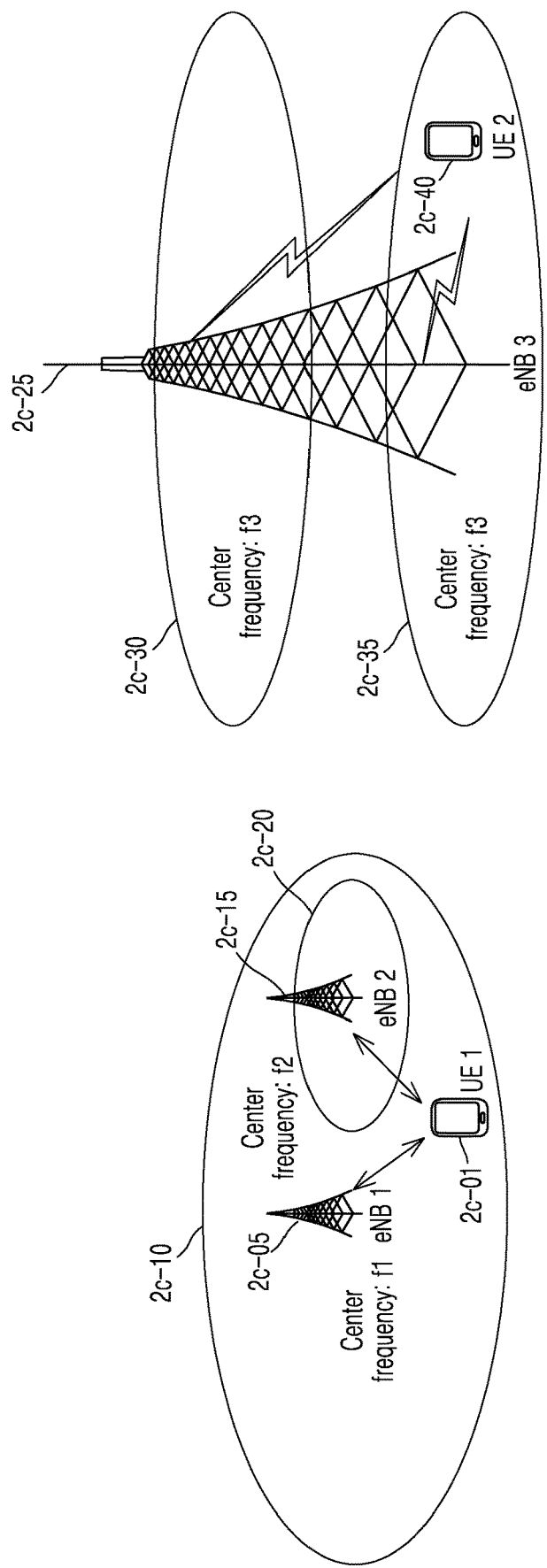
FIG. 11 is a diagram schematically illustrating dual conductivity and carrier aggregation performed by an LTE system.

FIG. 11 is a diagram schematically illustrating dual conductivity and carrier aggregation performed in an LTE system.

Referring to FIG. 11, when an eNB1 2c-05 transmits or receives a carrier with a center frequency f1, an eNB2 2c-15 transmits or receives a carrier with a center frequency f2, and a UE1 2c-01 combines a carrier with a forward center frequency f1 and a carrier with a forward center frequency f2, one UE may communicate with two or more base stations. The LTE system supports such an operation which is called dual connectivity (DC).

Generally, an eNB3 2c-25 may transmit and receive multiple carriers over multiple frequency bands. For example, in the related art, when a carrier 2c-30 with a forward center frequency f3 and a carrier 2c-35 with a forward center frequency f4 are transmitted from the eNB3 2c-25, a UE2 2c-40 transmits data using one of these two carriers. However, the UE2 2c-40 having carrier aggregation capability is capable of transmitting and receiving data in multiple carriers at the same time. The eNB3 2c-25 may allocate more carriers to the UE2 (2c-40) having carrier aggregation capability depending on a situation to increase a transmission rate of the UE2 2c-40. Aggregation of a forward carrier and reverse carriers transmitted and received by one base station as described above is called carrier aggregation (CA) in the base station. In the traditional sense, carrier aggregation is understood as simultaneously transmitting or receiving data by a UE through multiple cells when one forward carrier transmitted from one base station and one reverse carrier received by the base station constitute one cell. Through CA, a maximum transmission rate is increased in proportion to the number of carriers to be aggregated.

Hereinafter, in the present disclosure, receiving data in an arbitrary forward carrier or transmitting data in an arbitrary uplink carrier by a UE has the same meaning as transmitting or receiving data in a control channel and a data channel provided by a cell corresponding to a center frequency characterizing the carrier and a frequency band.

In addition, in the present disclosure, a set of serving cells controlled by the same base station is defined as a cell group (CG). The cell group is divided into a master cell group (MCG) and a secondary cell group (SCG). The MCG refers to a set of serving cells controlled by a base station (a master eNB (MeNB)) that controls a primary cell (PCell), and the SCG refers to a set of serving cells controlled by a base station other than the base station controlling the PCell, i.e., a base station (a secondary eNB (SeNB)) that controls only secondary cells (SCells). A base station informs a UE of information as to whether a certain serving cell belongs to the MCG or the SCG in a process of configuring a corresponding serving cell.

"PCell" and "SCell" are terms indicating the types of serving cells which are configured in a UE. There are some differences between a PCell and a SCell. For example, the PCell always remains active but the SCell is repeatedly switched between an activation state and a deactivation state according to an indication from the base station. The mobility of the UE is controlled with respect to the PCell, and the SCell may be understood as an additional serving cell for data transmission and reception. In the present disclosure, the PCell and the SCell refer to the PCell and the SCell that are defined in the LTE standards 36.331 or 36.321 or the like. These terms may have the same meaning as those used in the LTE mobile communication system. In the present disclosure, terms such as "carrier", "component carrier", "serving cell" and the like are used interchangeably.

Referring back to FIG. 11, when the eNB1 2c-05 is a MeNB and the eNB2 2c-15 is a SeNB, a serving cell 2c-10 having a center frequency f1 belongs to the MCG and a serving cell 2c-20 having a center frequency f2 belongs to the SCG. It may be practically impossible to transmit HARQ feedback and channel state information (CSI) with respect to SCG SCells through a physical uplink control channel (PUCCH) of a PCell. The HARQ feedback should be transmitted within a HARQ Round Trip Time (RTT) (generally, 8 ms) because a transmission delay between the MeNB and the SeNB may be longer than the HARQ RTT. Due to this problem, PUCCH transmission resources are configured in one cell of the SCells belonging to the SCG, i.e., the primary SCell (PSCell), and the HARQ feedback and the CSI with respect to the SCG SCells and the like are transmitted through the PUCCH.

In addition, in CA performed in the eNB3 2c-25, the UE2 2c-40 transmits the HARQ feedback and the CSI with respect to the SCell through the PUCCH of the PCell, as well as HARQ feedback and CSI with respect to the PCell. This is to apply a CA operation to a UE that cannot perform simultaneous uplink transmission. In LTE Rel-13 eCA (enhanced CA), an additional SCell having a PUCCH is defined and up to thirty two carriers can be integrated.

Figure 12:
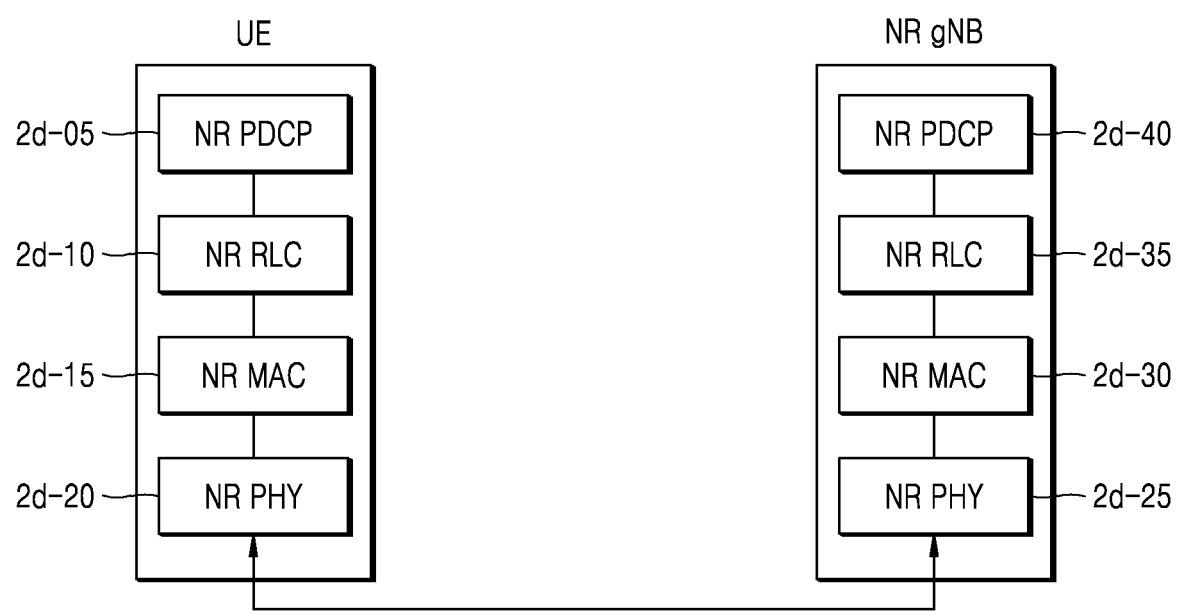
FIG. 12 is a diagram illustrating a radio protocol architecture of a next-generation mobile communication system to which an embodiment is applied.

FIG. 12 is a diagram illustrating a radio protocol architecture of a next-generation mobile communication system to which an embodiment is applied.

Referring to FIG. 12, radio protocols of the next-generation mobile communication system include NR PDCPs 2d-05 and 2d-40, NR RLCs 2d-10 and 2d-35, and NR MACs 2d-15 and 2d-30 in a UE and an NR base station.

Main functions of the NR PDCPs 2d-05 and 2d-40 may include some of the following functions:
- header compression and decompression: ROHC only;
- transfer of user data;
- in-sequence delivery of upper layer PDUs;
- PDCP PDU reordering for reception;
- duplicate detection of lower layer SDUs;
- retransmission of PDCP SDUs;
- ciphering and deciphering; and
- timer-based SDU discarding in uplink.

Here, a reordering function of an NR PDCP device refers to a function of reordering PDCP PDUs received from a lower layer in order according to a PDCP sequence number (SN), and may include a function of transmitting data to an upper layer in the rearranged order, a function of recording lost PDCP PDUs by rearranging the PDCP PDUs, a function of reporting a state of the lost PDCP PDUs to a transmitting side, and a function of requesting retransmission of the lost PDCP PDUs.

Main functions of the NR RLCs 2d-10 and 2d-35 may include some of the following functions:
- transfer of upper layer PDUs;
- in-sequence delivery of upper layer PDUs;
- out-of-sequence delivery of upper layer PDUs;
- ARQ function (error correction through ARQ);
- concatenation, segmentation and reassembly of RLC SDUs;
- re-segmentation of RLC data PDUs;
- reordering of RLC data PDUs;
- duplicate detection;
- protocol error detection;
- RLC SDU discard; and
- RLC re-establishment Here, the in-sequence delivery of an NR RLC device refers to a function of sequentially transmitting RLC SDUs received from a lower layer to an upper layer, and may include a function of reassembling and transmitting RLC SDUs when one RLC SDU is received by being divided into the RLC SDUs, a function of rearranging the received RLC PUDs in an RLC sequence number (SN) order or a PDCP SN order, a function of recording lost RLC PDUs by rearranging the RLC PUDs, a function of reporting a state of the lost RLC PDUs to a transmitting side, a function of requesting retransmission of the lost RLC PDUs, a function of sequentially transmitting only RLC SDUs preceding lost RLC SDUs, if any, to an upper layer, a function of sequentially all RLC SDUs to an upper layer before the start of a certain timer when the timer expires, even if there are lost RLC SDUs, or a function of sequentially transmitting all RLC SDUs received so far to an upper layer when a certain timer expires even if there are lost RLC SDUs. In this case, the RLC PDUs may be processed in the order in which they are received (in an order of arrival regardless of the sequence number order) and transmitted to a PDCP device in any order (out-of-sequence delivery). Segments stored in a buffer or to be received at a later time may be received and reconstructed into a complete RLC PDU, and the RLC PDU may be processed and transmitted to the PDCP device. An NR RLC layer may not include a concatenation function, and the concatenation function may be performed by an NR MAC layer or replaced by a multiplexing function of the NR MAC layer.

Here, the out-of-sequence delivery function of the NR RLC device refers to a function of directly transmitting RLC SDUs received from a lower layer to an upper layer in any order, and includes a function of reassembling and transmitting RLC SDUs when one RLC SDU is received by being divided into the RLC SDUs and a function of recording lost RLC PDUs by storing an RLC SN or PDCP SN of the received RLC PDUs and rearranging the RLC PDUs.

The NR MACs 2d-15 and 2d-30 may be connected to several NR RLC layer devices in one UE, and main functions thereof may include some of the following functions:
- mapping between logical channels and transport channels;
- multiplexing/demultiplexing of MAC SDUs;
- scheduling information reporting;
- HARQ function (error correction through HARQ);
- priority handling between logical channels of one UE;
- priority handling between UEs by means of dynamic scheduling;
- MBMS service identification;
- transport format selection; and
- padding.

The NR PHY layers 2b-20 and 2b-25 channel-code and modulate upper-layer data into an OFDM symbol and transmit the OFDM symbol through a radio channel, and demodulate and channel-decode an OFDM symbol received through the radio channel and transmits resultant data to an upper layer.

Although not shown, there is a Radio Resource Control (RRC) layer above a PDCP layer of each of the UE and the NR base station, and the RRC layer may provide a configuration control message related to access and measurement for radio resource control.

Figure 13:
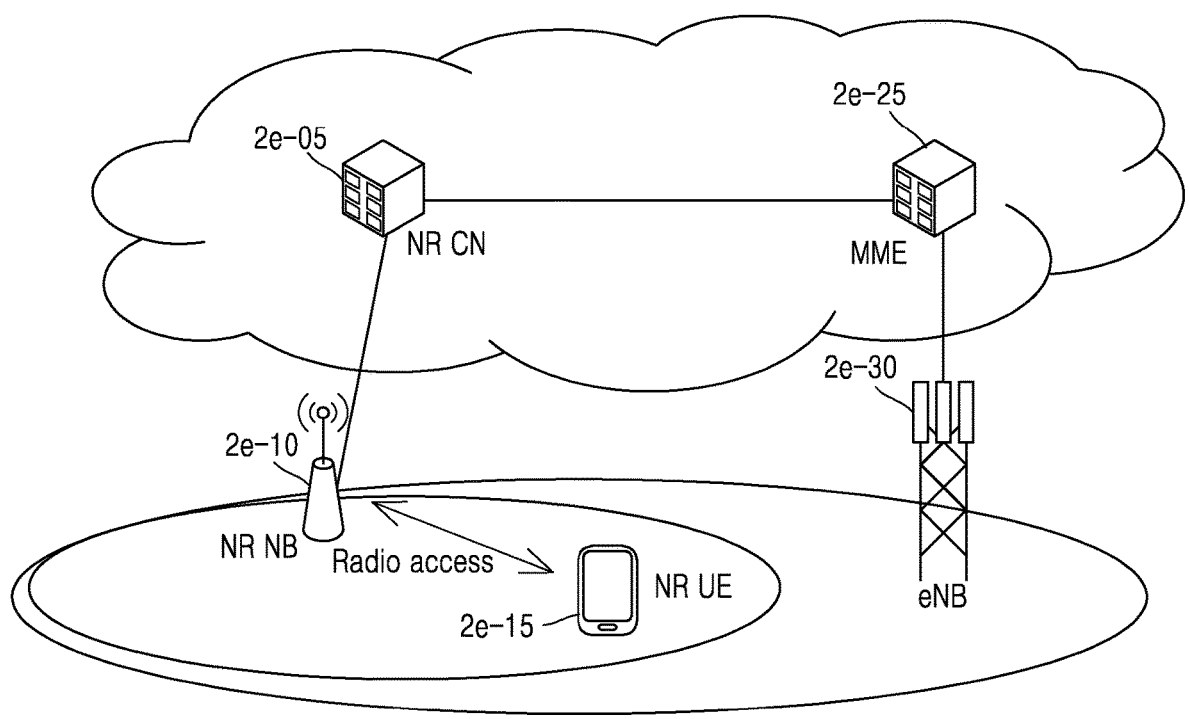
FIG. 13 is a diagram illustrating a structure of a next-generation mobile communication system to which an embodiment is applied.

FIG. 13 is a diagram illustrating a structure of a next-generation mobile communication system to which an embodiment is applied.

Referring to FIG. 13, a radio access network of the next-generation mobile communication system (hereinafter referred to as an NR or 5G system) includes a new radio node B (NR NB, NR gNB or NR base station) 2e-10 and a new radio core network (NR CN or a next-generation core network (NG CN) 2e-05. A new radio user equipment (NR UE or UE) 2a-15 is connected to an external network through the NR gNB 2e-10 and the NR CN 2e-05.

In FIG. 13, the NR gNB 2e-10 corresponds to an eNB of an existing LTE system. The gNB 2e-10 is connected to the NR UE 2e-15 through a wireless channel and may provide better services than an existing Node B. In the next-generation mobile communication system, because all user traffic is serviced through a shared channel, a device for scheduling by collecting status information, such as a buffer state, an available transmission power state, and a channel state of UEs, is needed and the NR gNB 2e-10 performs this function of the device. Generally, one NR gNB controls a plurality of cells. In order to implement ultra-high-speed data transmission compared to the existing LTE, a bandwidth may be set to an existing maximum bandwidth or more and beamforming technology may be additionally combined with orthogonal frequency division multiplexing (OFDM) as wireless access technology. In addition, an adaptive modulation & coding (hereinafter referred to as AMC) scheme of determining a modulation scheme and a channel coding rate according to a channel state of a UE is applied. The NR CN 2e-05 performs functions such as mobility support, bearer configuration, and QoS configuration. The NR CN 2e-05 is a device that performs various control functions as well as UE mobility management and is connected to a plurality of base stations. In addition, the next-generation mobile communication system may be linked to the existing LTE system, and the NR CN 2e-05 is connected to an MME 2e-25 through a network interface. The MME 2e-25 is connected to an eNB 2e-30 which is an existing base station.

Figure 14:
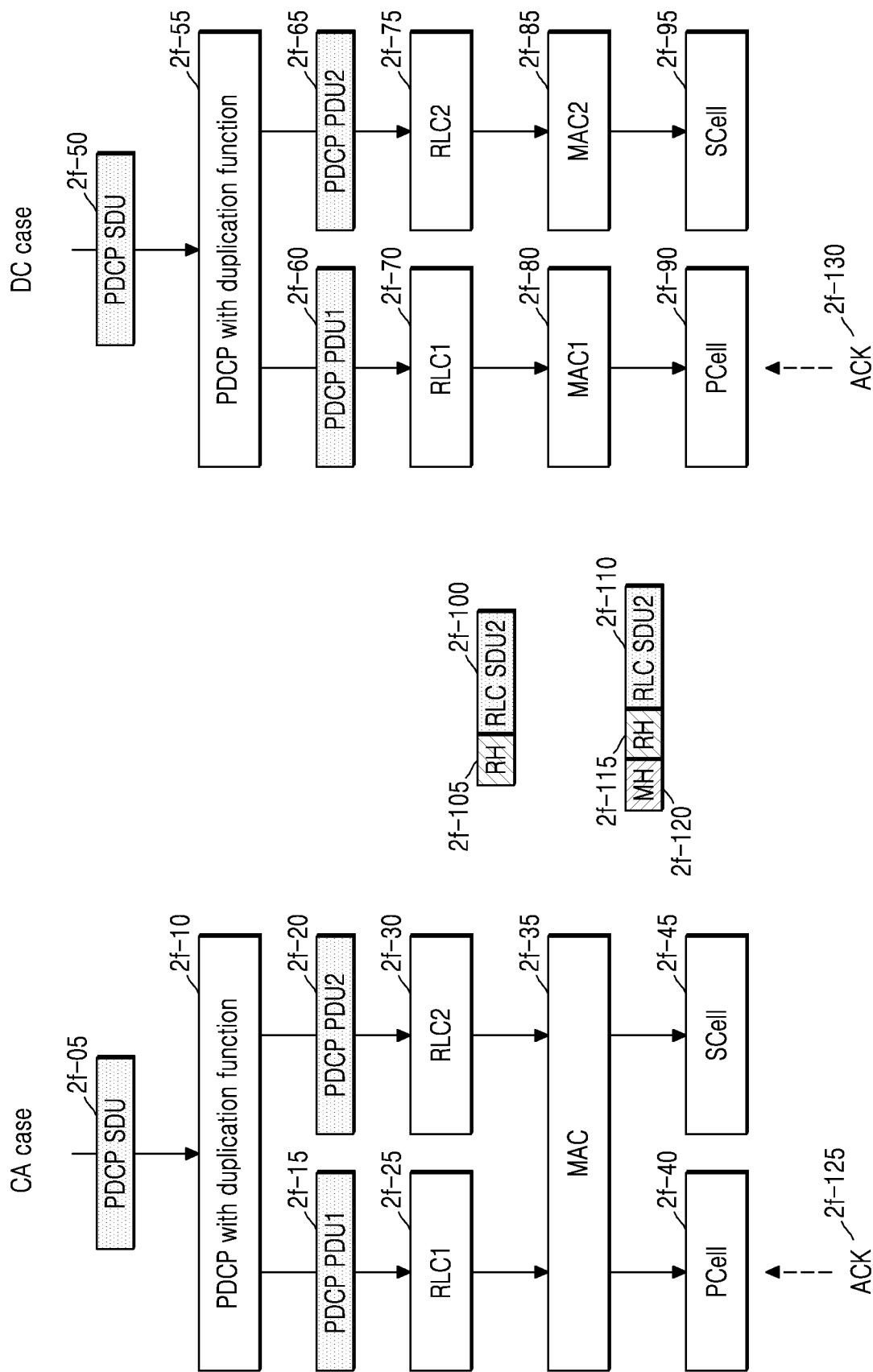
FIG. 14 is a diagram illustrating data transmission through packet duplication according to an embodiment, and more particularly, processing of a duplicated packet according to various conditions.

FIG. 14 is a diagram illustrating data transmission through packet duplication according to an embodiment, and more particularly, processing of a duplicated packet according to various conditions.

In the present disclosure, when in a next-generation mobile communication system, a UE performs packet duplication to support Ultra-Reliable Low Latency Communication (URLLC), duplicated data is transmitted in a different path (or expressed as leg) from that of the original packet. When the duplicated data is allocated to the same MAC PDU, duplication transmission is impossible and thus dual connectivity (DC) or carrier aggregation (CA) may be used when packet duplication is basically performed. That is, SgNB or SCell configuration should be configured so that the UE may support dual connectivity or carrier aggregation. In this disclosure, it is assumed that dual connectivity and carrier aggregation are configured, and basic principles will be described with respect to a method of processing a packet for each protocol structure.

Referring back to FIG. 14, a base station or a UE receives a data packet for URLLC, i.e., a PDCP SDU (2f-05 and 2f-50), from an upper layer, and transmits the PDCP to a layer of a PDCP. In operations 2f-10 and 2f-55, the PDCP determines whether to duplicate the data packet, generates an original PDCP PDU1 and a duplicated PDCP PDU2 when the data packet needs to be duplicated (2f-15, 2f-20, 2f-60, and 2f-65), and transmits the original PDCP PDU1 and the duplicated PDCP PDU2 to an RLC layer (2f-25, 2f-30, 2f-70, and 2f-75). In the above operation, the determination as to whether to duplicate the data packet is performed by packet duplication activation/deactivation MAC CE (hereinafter referred to as Du A/D MAC CE) received from the base station. An RLC1 P-LCH and an RLC2 S-LCH of each serving cell transmit the received data packet to the MgNB or a MAC layer of the UE. P-LCH refers to primary LCH and S-LCH refers to secondary LCH. In operations 2f-35, 2f-80, and 2f-85 (there may be one MAC in the case of CA, and there may be two MACs in the case of DC), the received data packet is mapped to an appropriate logical channel group (LCG), and a MAC PDU is generated by performing logical channel prioritization (LCP) and transmitted to physical layers 2f-40, 2f-45, 2f-90, and 2f-95 of a corresponding serving cell. For the LCP operation, the UE may perform restricting a serving cell for each logical channel, i.e., a serving cell restriction (lcp-allowedServingCells) operation, according to base station configurations. This is a mapping operation of a data packet of transmitting a certain logical channel only to a certain serving cell. This operation may show a difference in the case of URLLC and SRB. In the case of URLLC, some of limited serving cells for which transmission of URLLC is allowed are configured in the P-LCH and the other are configured in the S-LCH, whereas in the case of SRB, some of all serving cells are configured in the P-LCH and the other are configured in the S-LCH. This operation is applied to packet duplication as follows:

1. Packet duplication activation: an original data packet and a duplicated data packet are respectively transmitted through the P-LCH and the S-LCH, and allocated to different serving cells and transmitted in the different serving cells according to serving cell restrictions configured in each LCH during an LCP operation. Basically, serving cells configured in the P-LCH and the S-LCH may not overlap.

2. Packet duplication deactivation: Because there is no data transmission through the S-LCH, data is transmitted only through the P-LCH. In this case, when an existing configuration is maintained, the data is transmitted only to lcp-allowedServingCells of the P-LCH. However, when packet duplication is disabled, there is no data transmission through the S-LCH, and thus a range of serving cell to which the data is to be transmitted through the P-LCH may be increased when data transmission is not restricted with respect to lcp-allowedServingCells associated with the S-LCH.

In the present disclosure, the serving cell restriction operation is redefined in consideration of the above conditions and will be described in consideration of detailed operations in subsequent drawings.

Thereafter, the MAC PDU received by carrier aggregation or dual connectivity is transmitted to the physical layer, and a reception process is performed in an order reverse to an order in which the transmission process is performed. That is, the data packet (MAC PDU) is received through corresponding serving cells at the physical layer, and transmitted to the MAC layer of the UE or the corresponding base station. Thereafter, the PDCP PDU1 and the PDCP PDU2 received through the RLC are gathered to the PDCP of the UE or the base station, and the PDCP identifies the sequence numbers (SNs) of the received original packet and the duplicated packet, and deletes one of the packets and transmits the remaining packet to an upper layer when the same packets arrive.

Figure 15:
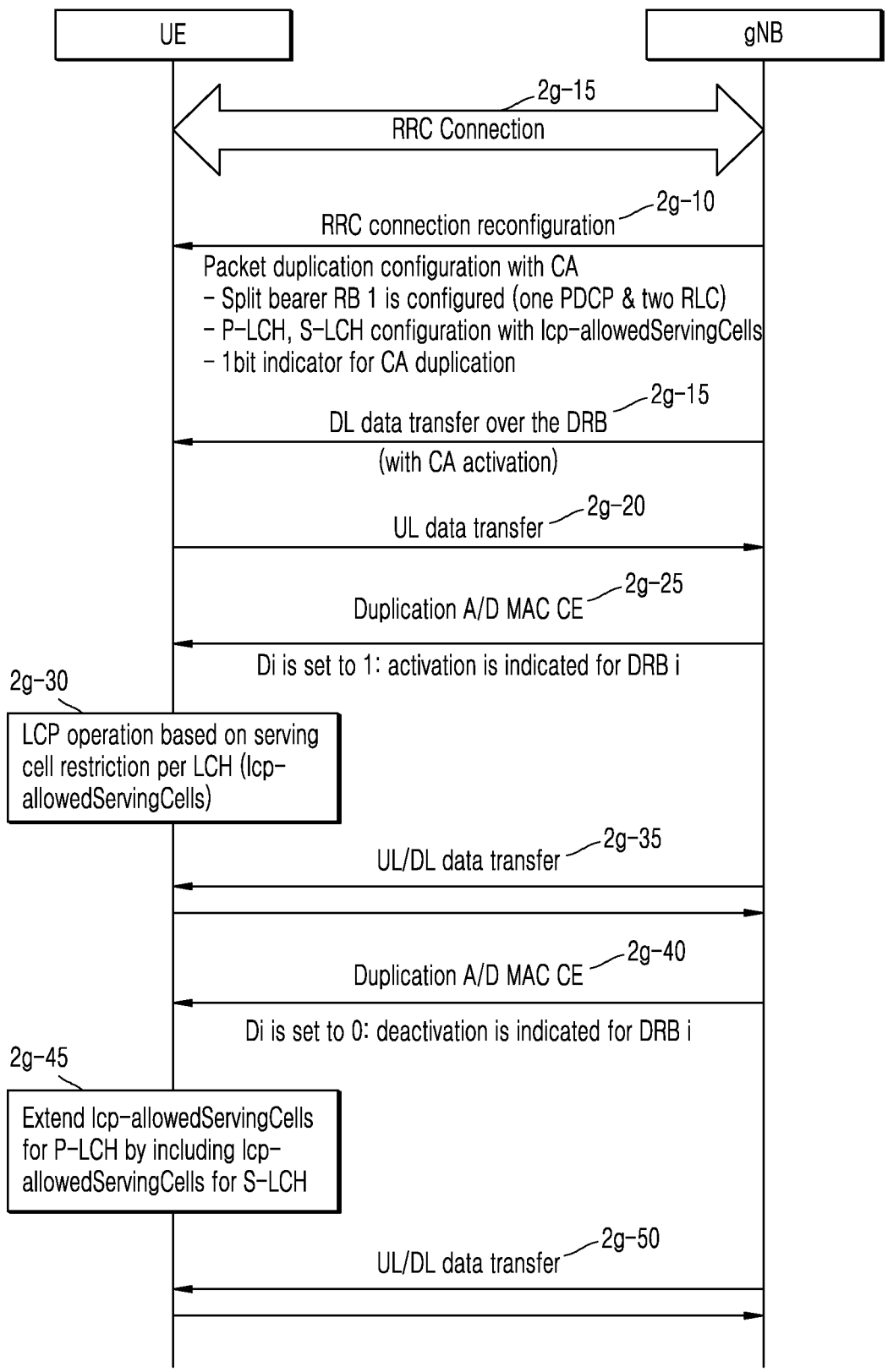
FIG. 15 is a diagram illustrating a method of configuring a serving cell restriction to perform logical channel prioritization when packet duplication using carrier aggregation (CA) is configured, according to an embodiment.

FIG. 15 is a diagram illustrating a method of configuring serving cell restriction to perform logical channel prioritization when packet duplication using carrier aggregation (CA) is configured, according to an embodiment.

A UE establishes an RRC connection with a base station to transmit and receive data (2g-05), and receives an RRC message including a bearer configuration for certain traffic (e.g., URLLC) from the base station (2g-10). For this operation, CA or DC may be configured. In an embodiment, when CA is applied, a corresponding Data Radio Bearer (DRB) among RLCs of a SCell, i.e., an RLC, may be additionally configured for URLLC transmission, and an additional LCG cell group and a serving cell may be configured. In the configuration of the DRB, whether duplication is to be applied to each split bearer is indicated and a preferred path may be configured for each split bearer. That is, an indicator instructing packet duplication may be indicated for a certain Radio Bearer (RB) i. In this case, a split bearer may be configured for the RB i and thus one PDCP and two RLCs may be configured. The preferred path may be mapped to certain logical channel ID to be designated as a path through which a certain service is delivered. Alternatively, the preferred path may be used to designate a path through which an original data packet is transmitted, and may be used to determine which path is to be used when both two paths have good quality. In the DBR configuration, parameters related to LCP may be configured for each LCH (logicalChannelConfig). Priority, PBR, BSD, and LCG of each LCH may be configured as the parameters. In the configuration of the DRB, two RLCs are configured for the split bearer and a corresponding RLC is designated as a certain LCH and thus two LCH-related configurations may exist. As described above, for an LCP operation, the UE may perform restricting a serving cell for each logical channel, i.e., a serving cell restriction (lcp-allowedServingCells) operation, according to base station configurations. This is a mapping operation of a data packet of transmitting a certain logical channel only to a certain serving cell. This operation may show a difference in the case of URLLC and SRB. In the case of URLLC, some of limited serving cells for which transmission of URLLC is allowed are configured in the P-LCH and the other are configured in the S-LCH, whereas in the case of SRB, some of all serving cells are configured in the P-LCH and the other are configured in the S-LCH. Additionally, in operation 2g-10, a 1-bit indicator instructing packet duplication for CA according to base station configurations may be received. This is to perform the serving cell restriction (lcp-allowedServingCells) operation differently from an existing operation when this indicator is received, i.e., when CA packet duplication is deactivated, as will be described in detail below.

In operations 2g-15 and 2g-20, the UE performs data transmission and reception through the configured DRB, and CA may be activated to transmit and receive data but packet duplication is deactivated. That is, data is transmitted and receive by applying CA to transmission and reception of data packets rather than packet duplication. In the case of downlink, the base station may immediately perform downlink packet duplication on a split bearer for which packet duplication is configured. In contrast, uplink packet duplication is performed after activation/deactivation is instructed through Du A/D MAC CE and thus is not applied at the present stage.

In operation 2g-25, when receiving a MAC CE that activates packet duplication for the corresponding DRB, i.e., when receiving an indication to activate packet duplication for a DRB i, the UE performs uplink data packet duplication for the DRB i. In operation 2g-30, the UE performs a predetermined serving cell restriction, i.e., lcp-allowedServingCells for each LCH (the P-LCH is mapped to a serving cell to which an original data packet is transmitted and the S-LCH is mapped to a serving cell to which a duplicated data packet is transmitted) and an LCP procedure according to corresponding details, and generates a data packet (MAC PDU) and transmits it to a lower layer. That is, the original data packet and the duplicated data packet are respectively transmitted through the P-LCH and the S-LCH, and allocated to different serving cells and transmitted in the different serving cells according to the serving cell restriction configured in each LCH during an LCP operation. Basically, serving cells configured in the P-LCH and the S-LCH may not overlap. In operation 2g-35, the UE establishes original and packet duplication data communication through the configured serving cells.

In operation 2g-40, when receiving a MAC CE that deactivates packet duplication for a corresponding DRB, i.e., when receiving an indicator instructing to deactivate packet duplication for the DRB i, the UE stops uplink data packet duplication for the DRB i. In operation 2g-45, the UE updates the predetermined serving cell restriction operation, i.e., lcp-allowedServingCells, for each LCH according to corresponding details. This operation is limited to a case in which CA packet duplication deactivation is instructed, and the UE may identify CA packet duplication through a 1 bit indicator instructing CA packet duplication when a configuration of packet duplication for a corresponding DRB is received from the base station. When the UE receives a packet duplication deactivation MAC CE, because there is no data transmission through the S-LCH, data is transmitted only through the P-LCH. In this case, when an existing configuration is maintained, the data is transmitted only to lcp-allowedServingCells of the P-LCH. When packet duplication is deactivated, there is no data transmission through the S-LCH, and thus, unless transmission is restricted for lcp-allowedServingCells associated with the S-LCH, a range of serving cells to which data is to be transmitted through the P-LCH may be increased by merging a list of serving cells to which data is transmittable through the P-LCH with a list or previously configured serving cells to which data is transmittable through the S-LCH. This may be expressed below in terms of signaling.

lcp-allowedServingCells_Primary_deactivate=lcp-allowedServingCells_Primary_activate+lcp-allowedServingCells_Secondary_activate.

The reason why such an operation can be performed is because LCP-and-MAC-related operations with respect to the P-LCH and the S-LCH are performed in CA packet duplication by one MAC entity and thus packet duplication deactivation may be efficiently performed by applying management of a serving cell corresponding to the S-LCH to the P-LCH.

In operation 2g-50, the UE establishes communication through the configured serving cells.

In an embodiment, a method of restricting a serving cell for each logical channel during activation or deactivation of packet duplication using CA has been described and may be classified as an exceptional case with respect to other general serving cell restriction methods. As described above, in the case of CA packet duplication, the serving cell restriction operation is performed by one MAC entity of a UE for each LCP and each logical channel and thus resource management may be efficiently performed. According to the present disclosure, serving cell restriction for each logical channel may be updated when CA packet duplication is deactivated.

A method of differently configuring a serving cell restriction for each logical channel in the case of CA packet duplication from other general situations may be further considered. For example, in existing general URLLC, when packet duplication and serving cell restriction are used, some of limited serving cells for which URLLC transmission is allowed are configured for the P-LCH and the other serving cells are configured for the S-LCH, whereas in the case of CA packet duplication, some of limited serving cells for which URLLC transmission is allowed are configured for the S-LCH and all the limited serving cells, including the serving cells configured for the S-LCH, for which URLLC transmission is allowed are configured for the P-LCH. When packet duplication is activated, it is necessary to place a restriction that UE MAC entity should configure the P-LCH, excluding serving cells allocated to the S-LCH. When packet duplication is deactivated, there is no data transmission in the serving cells allocated to the S-LCH and thus this restriction is ignorable. Through the P-LCH, data transmission is possible in predetermined serving cells allocated to the P-LCH without additionally updating serving cells.

Figure 16:
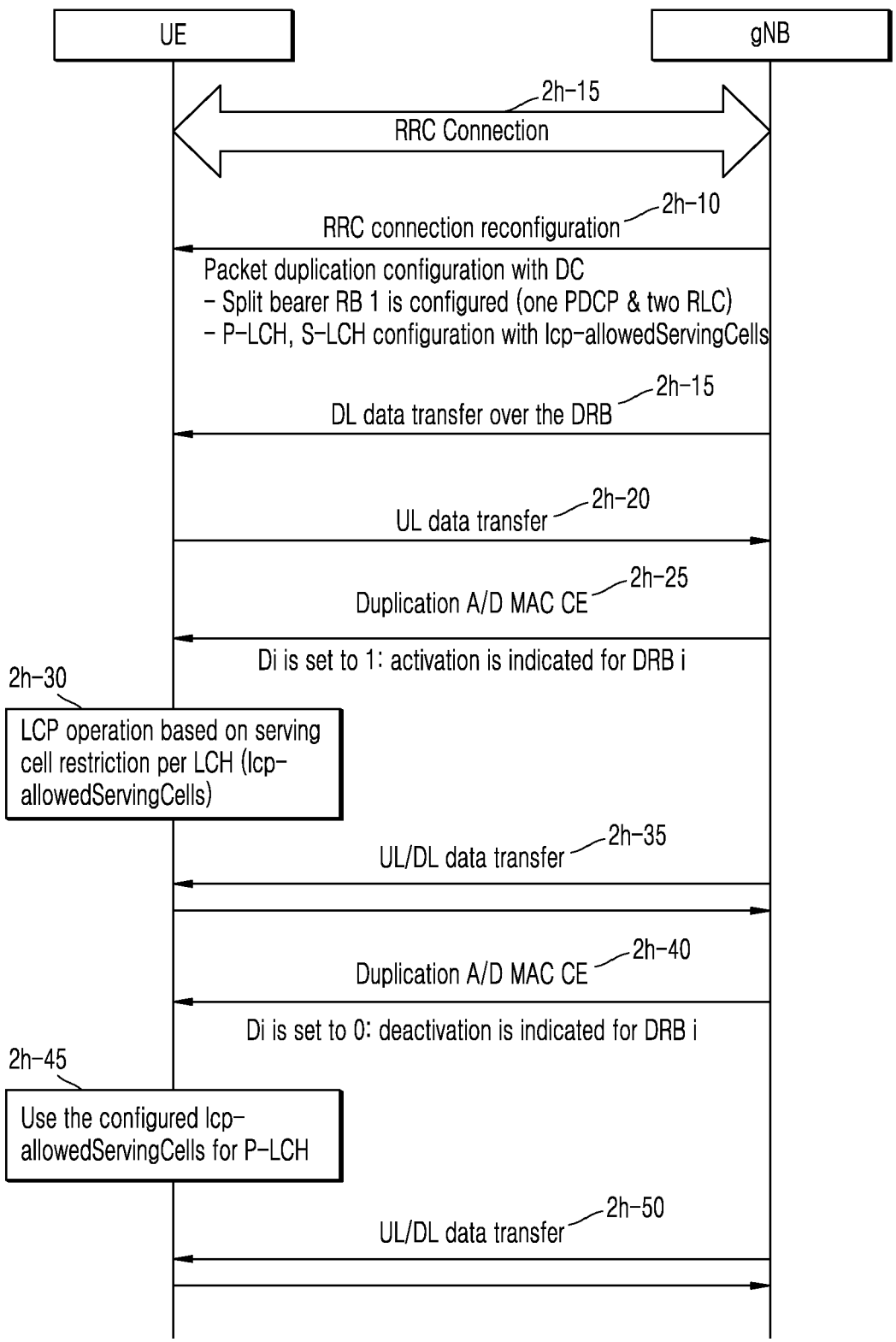
FIG. 16 is a diagram illustrating a method of configuring a serving cell restriction to perform logical channel prioritization when packet duplication using dual connectivity (DC) is configured, according to an embodiment.

FIG. 16 is a diagram illustrating a method of configuring a serving cell restriction to perform logical channel prioritization when packet duplication using dual connectivity (DC) is configured, according to an embodiment.

A UE establishes an RRC connection with a base station to transmit and receive data (2h-05), and receives an RRC message including a bearer configuration for certain traffic (e.g., URLLC) from the base station (2h-10). For this operation, CA or DC may be configured, and in the present disclosure, when DC is applied, a configuration of a DRB corresponding to a configuration for MCG and SCG cells, i.e., a configuration of a logical channel (RLC) for URLLC and an additional LCG cell group and serving cells, may be included. In the configuration of the DRB, whether duplication is to be applied to each split bearer may be indicated and a preferred path may be configured for each split bearer. That is, an indicator instructing packet duplication may be indicated for a certain Radio Bearer (RB) i. In this case, a split bearer may be configured for the RB i and thus one PDCP and two RLCs may be configured. The preferred path may be mapped to certain logical channel ID to be designated as a path through which a certain service is delivered. Alternatively, the preferred path may be used to designate a path through which an original data packet is transmitted, and may be used to determine which path is to be used when both two paths have good quality. In the configuration of the DBR, parameters related to LCP may be configured for each LCH (logicalChannelConfig). Priority, PBR, BSD, and LCG of each LCH may be configured as the parameters. In the configuration of the DRB, two RLCs are configured for the split bearer and a corresponding RLC is designated as a certain LCH and thus two LCH-related configurations may exist. As described above, for an LCP operation, the UE may perform restricting a serving cell for each logical channel, i.e., a serving cell restriction (lcp-allowedServingCells) operation, according to base station configurations. This is a mapping operation of a data packet of transmitting a certain logical channel only to a certain serving cell. Additionally, in operation 2h-10, when a 1-bit indicator instructing packet duplication for CA is received according to base station configurations, this indicator may be configured to 0 for DC.

In operations 2h-15 and 2h-20, the UE performs data transmission and reception through the configured DRB, and DC may be activated to transmit and receive data but packet duplication is deactivated. That is, data is transmitted and receive by applying DC to transmission and reception of data packets rather than packet duplication. In the case of downlink, the base station may immediately perform downlink packet duplication on a split bearer for which packet duplication is configured. In contrast, uplink packet duplication is performed after activation/deactivation is instructed through Du A/D MAC CE and thus is not applied at the present stage.

In operation 2h-25, when receiving a MAC CE that activates packet duplication for the corresponding DRB, i.e., when receiving an indicator instructing to activate packet duplication for a DRB i, the UE performs uplink data packet duplication for the DRB i. In operation 2h-30, the UE performs a predetermined serving cell restriction, i.e., lcp-allowedServingCells for each LCH (the P-LCH is mapped to a serving cell to which an original data packet is transmitted and the S-LCH is mapped to a serving cell to which a duplicated data packet is transmitted) and an LCP procedure according to corresponding details, and generates a data packet (MAC PDU) and transmits it to a lower layer. That is, the original data packet and the duplicated data packet are respectively transmitted through the P-LCH and the S-LCH, and allocated to different serving cells and transmitted in the different serving cells according to the serving cell restriction configured in each LCH during an LCP operation. Basically, serving cells configured in the P-LCH and the S-LCH may not overlap. In operation 2h-35, the UE transfers original and packet duplication data through the configured serving cells.

In operation 2h-40, when receiving a MAC CE that deactivates packet duplication for a corresponding DRB, i.e., when receiving an indicator instructing to deactivate packet duplication for the DRB i, the UE stops uplink data packet duplication for the DRB i. In operation 2h-45, the UE performs an LCP operation by directly using a predetermined serving cell restriction operation, i.e., lcp-allowed-ServingCells, for each LCH according to corresponding details. This operation may be identified through a 1-bit indicator, which instructs CA packet duplication and is received according to base station configurations, in operation 2h-10. In an embodiment, the indicator may be configured to 0. When the UE receives a packet duplication deactivation MAC CE, because there is no data transmission through the S-LCH, data is transmitted only through the P-LCH. In this case, when an existing configuration is maintained, the data is transmitted only to lcp-allowedServingCells of the P-LCH. When packet duplication is deactivated, data is not transmitted through the S-LCH and thus transmission is limited to lcp-allowedServingCells associated with the S-LCH, i.e., an original data packet may be transmitted to only serving cells included in a list of serving cells to which data is transmittable through the P-LCH after an LCP operation. This may be expressed below in terms of signaling.

lcp-allowedServingCells_Primary_deactivate=lcp-allowedServingCells_Primary_activate.

The reason why such an operation can be performed unlike in CA is because LCP-and-MAC-related operations with respect to the P-LCH and the S-LCH are performed in packet duplication by two MAC entities and thus packet duplication deactivation cannot be efficiently performed by applying management of a serving cell corresponding to the S-LCH to the P-LCH.

In operation 2h-50, the UE establishes communication through the configured serving cells.

In an embodiment, a method of restricting a serving cell for each logical channel during activation or deactivation of packet duplication using DC has been described above and may be performed according to the same principle as a general serving cell restriction method. As described above, in the case of DC packet duplication, the serving cell restriction operation is performed by two MAC entities of the UE for each LCP and each logical channel and thus parameters for serving cell restriction should be separately managed.

Figure 17:
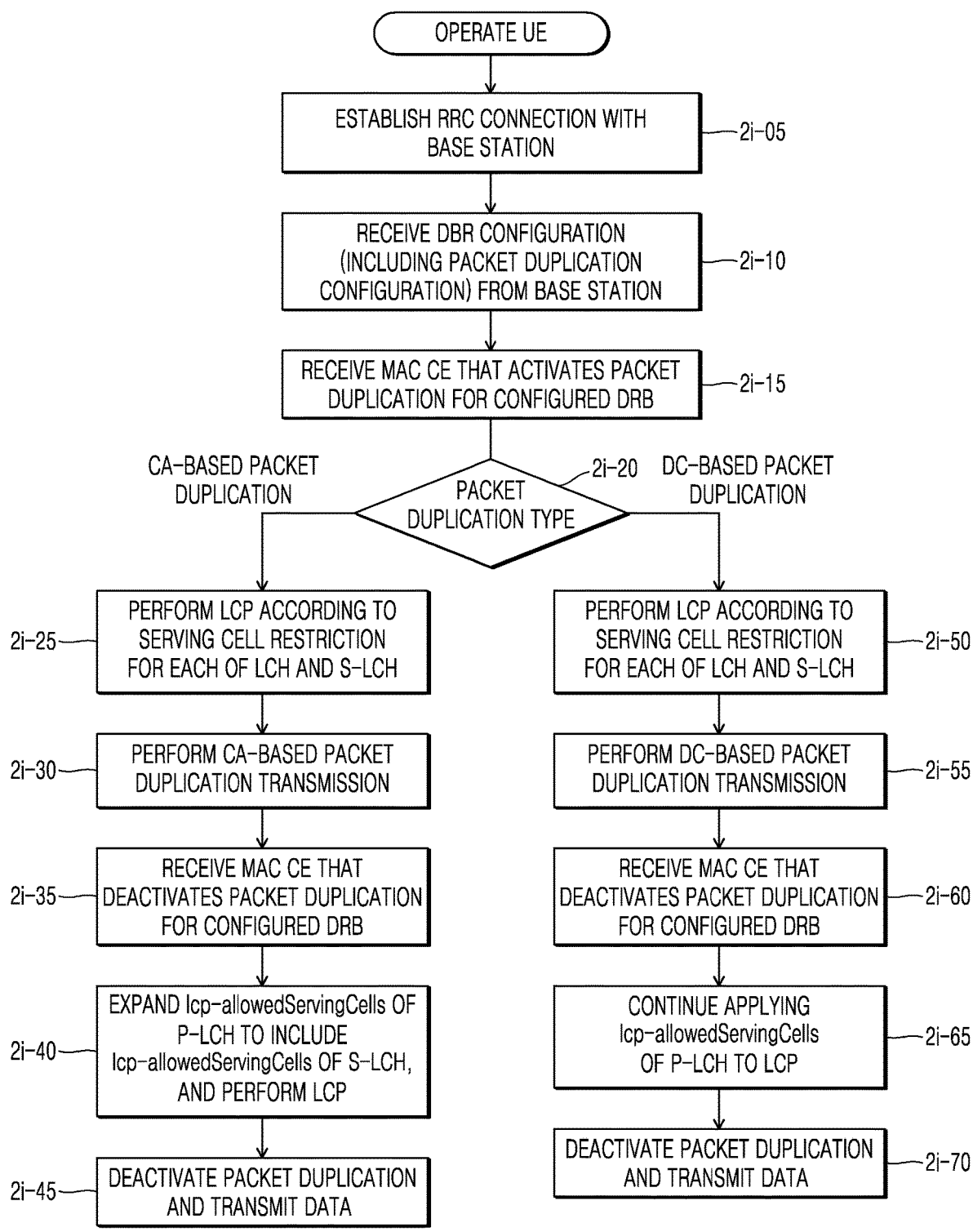
FIG. 17 is a diagram illustrating processing logical channel prioritization by a UE during packet duplication, according to an embodiment.

FIG. 17 is a diagram illustrating processing logical channel prioritization by a UE during packet duplication, according to an embodiment.

The UE establishes an RRC connection with a base station to transmit and receive data (2i-05), and receives an RRC message including a bearer configuration for certain traffic (e.g., URLLC) from the base station (2i-10). For this operation, CA or DC may be configured, and whether duplication is applied to each split bearer is indicated in the configuration of the DRB. That is, an indicator instructing packet duplication may be indicated for a certain Radio Bearer (RB) i. In this case, a split bearer may be configured for the RB i and thus one PDCP and two RLCs may be configured. In the DBR configuration, parameters related to LCP may be configured for each LCH (logicalChannelConfig). Priority, PBR, BSD, and LCG of each LCH may be configured as the parameters. In the configuration of the DRB, two RLCs are configured for the split bearer and a corresponding RLC is designated as a certain LCH and thus two LCH-related configurations may exist. As described above, for an LCP operation, the UE may perform restricting a serving cell for each logical channel, i.e., a serving cell restriction (lcp-allowedServingCells) operation, according to base station configurations. This is a mapping operation of a data packet of transmitting a certain logical channel only to a certain serving cell. This operation may show a difference in the case of URLLC and SRB. In the case of URLLC, some of limited serving cells for which transmission of URLLC is allowed are configured in the P-LCH and the other are configured in the S-LCH, whereas in the case of SRB, some of all serving cells are configured in the P-LCH and the other are configured in the S-LCH. Additionally, in operation 2i-10, a 1-bit indicator instructing packet duplication for CA according to base station configurations may be received. This is to perform the serving cell restriction (lcp-allowedServingCells) operation differently from an existing operation when this indicator is received, i.e., when CA packet duplication is deactivated, as will be described in detail below.

In operation 2i-15, when receiving a MAC CE that activates packet duplication for a corresponding DRB, i.e., when receiving an indicator instructing to activate packet duplication for a DRB i, the UE performs uplink data packet duplication for the DRB i. In operation 2i-20, the UE performs packet duplication by dividing operations into two operations according to a type of packet duplication configured for the UE.

In operation 2i-25, when CA-based packet duplication is configured, a predetermined serving cell restriction, i.e., lcp-allowedServingCells for each LCH (the P-LCH is mapped to a serving cell to which an original data packet is transmitted and the S-LCH is mapped to a serving cell to which a duplicated data packet is transmitted) and an LCP procedure are performed, and a data packet (MAC PDU) is generated and transmitted to a lower layer. That is, the original data packet and the duplicated data packet are respectively transmitted through the P-LCH and the S-LCH, and allocated to different serving cells and transmitted in the different serving cells according to the serving cell restriction configured in each LCH during an LCP operation. Basically, serving cells configured in the P-LCH and the S-LCH may not overlap. In operation 2i-30, CA-based packet duplication transmission is performed. In operation 2i-35, when receiving a MAC CE that deactivates packet duplication for a corresponding DRB, i.e., when receiving an indicator instructing to deactivate packet duplication for the DRB i, the UE stops uplink data packet duplication for the DRB i and transmits original data. In operation 2i-40, when CA packet duplication deactivation is instructed, the UE checks a 1-bit indicator, which instructs CA packet duplication and is received when a configuration of packet duplication for a corresponding DRB is received from the base station, and updates the serving cell restriction for each logical channel. When the UE receives a packet duplication deactivation MAC CE, because there is no data transmission through the S-LCH, data is transmitted only through the P-LCH. In this case, when an existing configuration is maintained, the data is transmitted only to lcp-allowedServingCells of the P-LCH. When packet duplication is deactivated, there is no data transmission through the S-LCH, and thus, unless transmission is restricted for lep-allowedServingCells associated with the S-LCH, a range of serving cells to which data is to be transmitted through the P-LCH may be increased by merging a list of serving cells to which data is transmittable through the P-LCH with a list or previously configured serving cells to which data is transmittable through the S-LCH. This may be expressed below in terms of signaling.

lcp-allowedServingCells_Primary_deactivate=lcp-allowedServingCells_Primary_activate+lcp-allowedServingCells_Secondary_activate.

The reason why such an operation can be performed is because LCP-and-MAC-related operations with respect to the P-LCH and the S-LCH are performed by one MAC entity in CA packet duplication and thus packet duplication deactivation may be efficiently performed by applying management of a serving cell corresponding to the S-LCH to the P-LCH.

In operation 2i-50, when the UE receives a configuration of DC-based packet duplication from the base station and receives a MAC CE that activates packet duplication for a corresponding DRB in operation 2i-15, the UE performs a predetermined serving cell restriction operation, i.e., lcp-allowedServingCells, for each LCH (the P-LCH is mapped to a serving cell to which an original data packet is transmitted and the S-LCH is mapped to a serving cell to which a duplicated data packet is transmitted) and an LCP procedure, and generates a data packet (MAC PDU) and transmits it to a lower layer. That is, the original data packet and the duplicated data packet are respectively transmitted through the P-LCH and the S-LCH, and allocated to different serving cells and transmitted in the different serving cells according to the serving cell restriction configured in each LCH during the LCP operation. Basically, serving cells configured in the P-LCH and the S-LCH may not overlap. In operation 2i-55, DC-based packet duplication transmission is performed. In operation 2i-60, when receiving a MAC CE that deactivates packet duplication for a corresponding DRB, i.e., when receiving an indicator instructing to deactivate packet duplication for the DRB i, the UE stops uplink data packet duplication for the DRB i and transmits original data (2i-70). In operation 2i-65, when DC packet duplication deactivation is instructed, the UE checks a 1-bit indicator, which instructs non-DC packet duplication and is received when a configuration of packet duplication for a corresponding DRB is received from the base station, and performs an operation directly using the serving cell restriction for each logical channel. When the UE receives a packet duplication deactivation MAC CE, because there is no data transmission through the S-LCH, data is transmitted only through the P-LCH. In this case, when an existing configuration is maintained, the data is transmitted only to lcp-allowedServingCells of the P-LCH. When packet duplication is deactivated, data is not transmitted through the S-LCH and thus transmission is limited to lcp-allowedServingCells associated with the S-LCH, i.e., an original data packet may be transmitted to only serving cells included in a list of serving cells to which data is transmittable through the P-LCH after an LCP operation. This may be expressed below in terms of signaling.

lcp-allowedServingCells_Primary_deactivate=lcp-allowedServingCells_Primary_activate.

The reason why such an operation can be performed unlike in CA is because LCP-and-MAC-related operations with respect to the P-LCH and the S-LCH are performed in packet duplication by two MAC entities and thus packet duplication deactivation cannot be efficiently performed by applying management of a serving cell corresponding to the S-LCH to the P-LCH.

Figure 18:
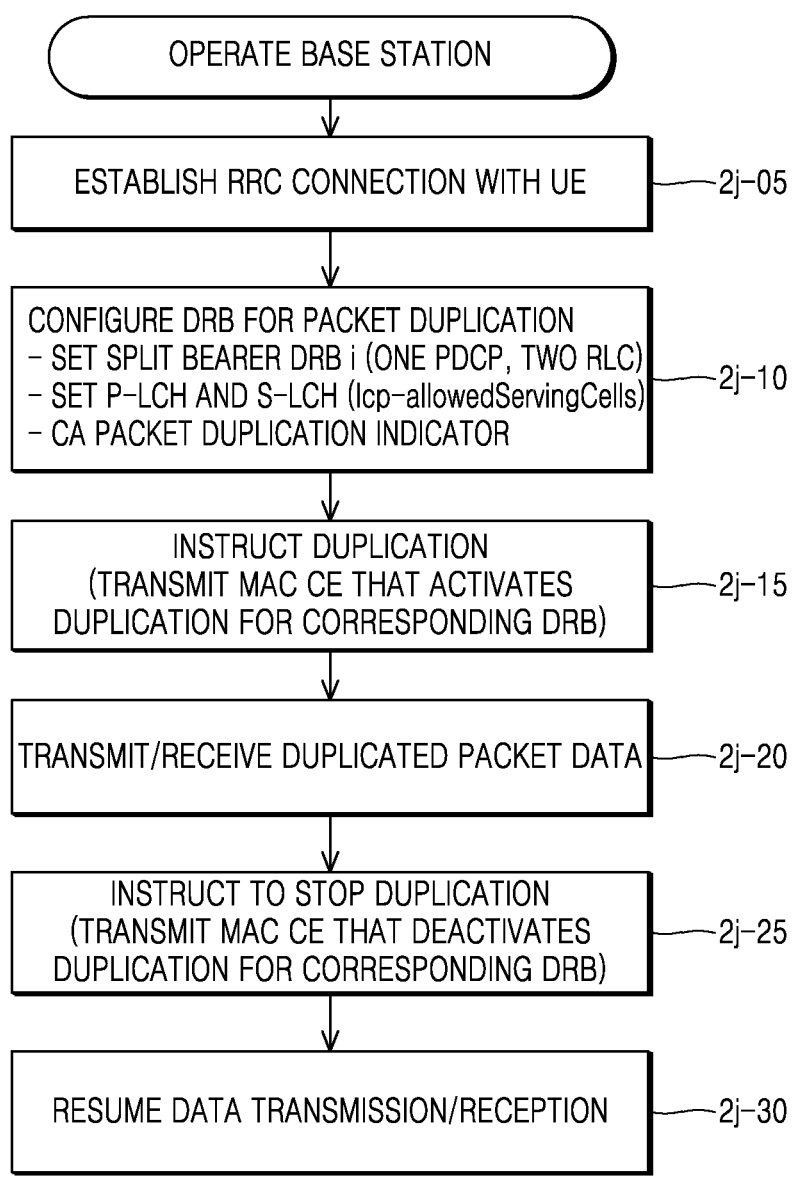
FIG. 18 is a diagram illustrating an operation of a base station for configuring logical channel prioritization in a packet duplication operation, according to an embodiment.

FIG. 18 is a diagram illustrating an operation of a base station for configuring logical channel prioritization in a packet duplication operation according to an embodiment.

The base station establishes an RRC connection with a UE in operation 2j-05, and configures a DRB to perform packet duplication by the UE in operation 2j-10. In this case, the base station may select whether packet duplication is performed based on CA or DC, and transmits related configuration parameters. When CA is applied, an RLC for transmission of a corresponding DRB, i.e., URLLC transmission, may be additionally configured among RLCs of a SCell, and an additional LCG cell group and serving cells may be configured. When DC is applied, a DRB corresponding to a configuration of MCG and SCG cells, i.e., a logical channel (RLC) for URLLC and an additional LCG cell group and serving cells serving cells, may be configured. In the configuration of the DRB, whether duplication is to be applied to each split bearer may be indicated and a preferred path may be configured for each split bearer. That is, an indicator instructing packet duplication may be indicated for a certain Radio Bearer (RB) i. In this case, a split bearer may be configured for the RB i and thus one PDCP and two RLCs may be configured. The preferred path may be mapped to certain logical channel ID to be designated as a path through which a certain service is delivered. Alternatively, the preferred path may be used to designate a path through which an original data packet is transmitted, and may be used to determine which path is to be used when both two paths have good quality. In the configuration of the DBR, parameters related to LCP may be configured for each LCH (logicalChannelConfig). Priority, PBR, BSD, and LCG of each LCH may be configured as the parameters. In the configuration of the DRB, two RLCs are configured for the split bearer and a corresponding RLC is designated as a certain LCH and thus two LCH-related configurations may exist. As described above, for an LCP operation, the base station may configure an operation of restricting a serving cell for each logical channel, i.e., a serving cell restriction (lcp-allowedServingCells) operation, with respect to the UE. This is a mapping operation of a data packet of transmitting a certain logical channel only to a certain serving cell. This operation may show a difference in the case of URLLC and SRB. In the case of URLLC, some of limited serving cells for which transmission of URLLC is allowed are configured in the P-LCH and the other are configured in the S-LCH, whereas in the case of SRB, some of all serving cells are configured in the P-LCH and the other are configured in the S-LCH. Additionally, in this operation, a 1-bit indicator instructing packet duplication for CA may be configured according to base station configurations. This is to instruct the UE to perform the serving cell restriction (lcp-allowedServingCells) operation differently from an existing operation when the UE receives this indicator, and particularly, when CA packet duplication is deactivated.

In operation 2j-15, the base station transmits a MAC CE instructing packet duplication activation to the UE so as to activate uplink packet duplication operation by the UE. The MAC CE may be instructed by configuring an indicator instructing to activate packet duplication for a certain DRB i, to 1, and the UE performs uplink data packet duplication for the DRB i when receiving the MAC CE (2j-20).

In operation 2j-25, the base station transmits a MAC CE instructing to deactivate packet duplication to the UE so as to deactivate uplink packet duplication performed by the UE. The MAC CE may be instructed by configuring an indicator instructing to activate packet duplication for the DRB i to 0, and the UE stops uplink data packet duplication for the DRB i when receiving the MAC CE (2j-30).

Figure 19:
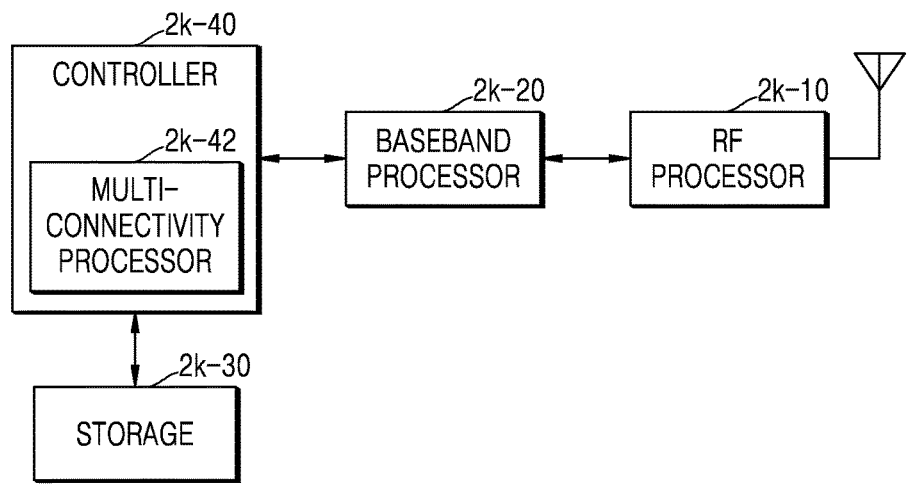
FIG. 19 is a block diagram illustrating a configuration of a UE according to an embodiment.

FIG. 19 is a block diagram illustrating a configuration of a UE according to an embodiment.

Referring to FIG. 19, the UE includes a RF processor 2k-10, a baseband processor 2k-20, a storage 2k-30, and a controller 2k-40.

The RF processor 2k-10 performs functions, such as signal-band conversion and amplification, to transmit and receive signals through a wireless channel. That is, the RF processor 2k-10 up-converts a baseband signal provided from the baseband processor 2k-20 into an RF band signal and transmits the RF band signal via an antenna, and down-converts an RF band signal received via the antenna into a baseband signal. For example, the RF processor 2k-10 may include a transmission filter, a reception filter, an amplifier, a mixer, an oscillator, a digital-to-analog convertor (DAC), an analog-to-digital convertor (ADC), and the like. Although only one antenna is shown in FIG. 19, the UE may include a plurality of antennas. The RF processor 2k-10 may include a plurality of RF chains. Furthermore, the RF processor 2k-10 may perform beamforming. For beamforming, the RF processor 2k-10 may adjust a phase and magnitude of each of signals transmitted and received through the plurality of antennas or antenna elements. In addition, the RF processor 1g-10 may perform MIMO and receive multiple layers when MIMO is performed.

The baseband processor 2k-20 performs conversion between a baseband signal and a bits string according to a physical layer standard of the system. For example, for data transmission, the baseband processor 2k-20 generates complex symbols by encoding and modulating a transmission bit string. For data reception, the baseband processor 2k-20 reconstructs a received bit string through demodulation and decoding of a baseband signal provided from the RF processor 2k-10. For example, when an orthogonal frequency division multiplexing (OFDM) scheme is used, for data transmission, the baseband processor 2k-20 generates complex symbols by encoding and modulating a transmission bit string, maps the complex symbols to subcarriers, and constructs OFDM symbols through inverse fast Fourier transform (IFFT) and cyclic prefix (CP) insertion. In addition, for data reception, the baseband processor 2k-20 divides a baseband signal from the RF processor 2k-10 into OFDM symbols, reconstructs signals mapped to subcarriers through fast Fourier transform (FFT), and reconstructs a received bit string by demodulation and decoding.

The baseband processor 2k-20 and the RF processor 2k-10 transmit and receive signals as described above. Accordingly, the baseband processor 2k-20 and the RF processor 2k-10 may be each referred to as a transmitter, a receiver, a transceiver, or a communicator. Furthermore, at least one of the baseband processor 2k-20 and the RF processor 2k-10 may include a plurality of communication modules to support different radio access technologies. In addition, at least one of the baseband processor 2k-20 and the RF processor 2k-10 may include different communication modules to process signals of different frequency bands. For example, different radio access technologies may include a wireless LAN (e.g., IEEE 802.11), a cellular network (e.g., LTE), and the like. In addition, different frequency bands may include a super-high-frequency (SHF) band (e.g., 2.NRHz or NRhz) and a millimeter wave band (e.g., 60 GHz).

The storage 2k-30 stores data such as a basic program, an application program, and configuration information for operation of the UE. In addition, the storage 2k-30 provides the stored data in response to a request from the controller 2k-40.

The controller 2k-40 controls overall operations of the UE. For example, the controller 2k-40 transmits and receives signals through the baseband processor 2k-20 and the RF processor 2k-10. Furthermore, the controller 2k-40 writes data to and reads data from the storage 2k-30. To this end, the controller 2k-40 may include at least one processor. For example, the controller 2k-40 may include a communication processor (CP) for control of communication and an application processor (AP) for control of an upper layer such as an application program.

Figure 20:
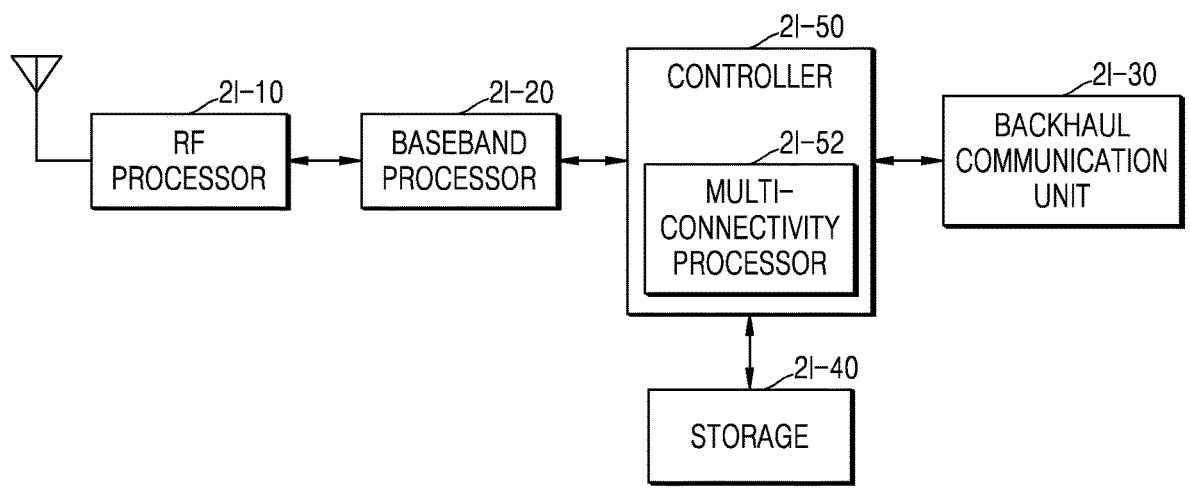
FIG. 20 is a block diagram illustrating a configuration of a base station according to an embodiment.

FIG. 20 is a block diagram illustrating a configuration of a base station according to an embodiment.

As illustrated in FIG. 20, the base station includes an RF processor 2*l*-10, a baseband processor 2*l*-20, a backhaul communicator 2*l*-30, a storage 2*l*-40, and a controller 2*l*-50.

The RF processor 2*l*-10 performs functions, such as signal-band conversion and amplification, to transmit and receive signals through a wireless channel. That is, the RF processor 2*l*-10 up-converts a baseband signal provided from the baseband processor 2*l*-20 into an RF band signal and transmits the RF band signal via an antenna, and down-converts an RF band signal received via the antenna into a baseband signal. For example, the RF processor 2*l*-10 may include a transmission filter, a reception filter, an amplifier, a mixer, an oscillator, a DAC, an ADC, and the like. Although only one antenna is illustrated in FIG. 20, embodiments are not limited thereto and the UE may include a plurality of antennas. The RF processor 2*l*-10 may include a plurality of RF chains. Furthermore, the RF processor 2*l*-10 may perform beamforming. For beamforming, the RF processor 2*l*-10 may adjust a phase and magnitude of each of signals transmitted and received through the plurality of antennas or antenna elements. The RF processor 2*l*-10 may perform a downlink MIMO operation by transmitting one or more layers.

The baseband processor 2*l*-20 performs conversion between a baseband signal and a bits string according to a physical layer standard. For example, for data transmission, the baseband processor 2*l*-20 generates complex symbols by encoding and modulating a transmission bit string. For data reception, the baseband processor 2*l*-20 reconstructs a received bit string through demodulation and decoding of a baseband signal provided from the RF processor 2*l*-10. For example, when the OFDM scheme is used, for data transmission, the baseband processor 2*l*-20 generates complex symbols by encoding and modulating a transmission bit string, maps the complex symbols to subcarriers, and then constructs OFDM symbols through IFFT and CP insertion. In addition, for data reception, the baseband processor 2*l*-20 divides a baseband signal from the RF processor 2*l*-10 into OFDM symbols, reconstructs signals mapped to subcarriers through FFT, and reconstructs a received bit string by demodulation and decoding. The baseband processor 2*l*-20 and the RF processor 2*l*-10 transmit and receive signals as described above. Accordingly, the baseband processor 2*l*-20 and the RF processor 2*l*-10 may be each referred to as a transmitter, a receiver, a transceiver, a communicator, or a wireless communicator.

The backhaul communicator 2*l*-30 provides an interface for communication with other nodes in a network. That is, the backhaul communicator 2*l*-30 converts a bit string transmitted from a main base station to another node, e.g., an auxiliary base station or a core network, into a physical signal, and converts a physical signal received from another node into a bit string.

The storage 2*l*-40 stores data such as a basic program, an application program, and configuration information for operation of the main base station. In particular, the storage 2*l*-40 may store information about a bearer allocated to a connected UE, measurement results reported from the connected UE, and the like. The storage 2*l*-40 may further store information serving as a criterion for determining whether to provide dual conductivity to the UE or stop the dual conductivity. In addition, the storage 2*l*-40 provides the stored data in response to a request from the controller 2*l*-50.

The controller 2*l*-50 controls overall operations of the main base station. For example, the controller 2*l*-50 transmits and receives signals through the baseband processor 2*l*-20 and the RF processor 2*l*-10 or through the backhaul communicator 2*l*-30. Furthermore, the controller 2*l*-50 writes data to and reads data from the storage 2*l*-40. To this end, the controller 2*l*-50 may include at least one processor.

The embodiments of the present disclosure set forth in the present specification and drawings are merely intended to provide examples to easily explain the technical matters of the present disclosure and help understanding of the present disclosure, and are not intended to limit the scope of the present disclosure. That is, it will be obvious to those of ordinary skill in the art that other modified examples based on the technical spirit of the present disclosure can be implemented. These embodiment can be implemented in combination as necessary. For example, part of the embodiments may be combined with each other to operate a base station and a UE. The above-described embodiments have been presented with respect to an NR system but other modified examples based on the technical idea of the embodiments may be implemented in other systems such as an FDD or TDD LTE system.

Although example embodiments of the present disclosure are set forth in the present specification and drawings and specific terms are used herein, they are merely provided in a general sense to easily explain the technical idea of the present disclosure and help understanding of the present disclosure and are not intended to limit the scope of the present disclosure. It will be obvious to those of ordinary skill in the art that other modified examples based on the technical spirit of the present disclosure can be implemented.

The invention claimed is:

1. An operation method of a user equipment (UE) in a wireless communication system, the operation method comprising:

receiving, from a base station, a radio resource control (RRC) message including packet duplication information for a packet data convergence protocol (PDCP) configuration and allowed serving cell information for a logical channel configuration, wherein a PDCP entity is configured with a primary radio link control (RLC) entity associated with primary logical channel (P-LCH) and a secondary RLC entity associated with a secondary logical channel (S-LCH);

receiving, from the base station, a media access control (MAC) control element (CE) including an indication for instructing activation or deactivation of a packet duplication;

in case that the indicator instructs the deactivation of the packet duplication, identifying whether a carrier aggregation (CA) based packet duplication is configured or a dual connectivity (DC) based packet duplication is configured:

if the CA based packet duplication is configured, transmitting a packet to the P-LCH, wherein the allowed serving cell information is not applied to determine serving cells, and if the DC based packet duplication is configured, transmitting the packet to the P-LCH or S-LCH; and in case that the indicator instructs the activation of the packet duplication, performing the packet duplication on the packet and identifying whether the CA based packet duplication is configured or the DC based packet duplication is configured:

if the CA based packet duplication is configured, transmitting the packet and a duplicated packet to the P-LCH and the S-LCH associated with each allowed serving cell based on the allowed serving cell information, and if the DC based packet duplication is configured, transmitting the packet and the duplicated packet to the P-LCH of a master cell group (MCG) and the S-LCH of a secondary cell group (SCG).

2. An operation method of a base station in a wireless communication system, the operation method comprising:
 transmitting, to a user equipment (UE), a radio resource control (RRC) message including packet duplication information for a packet data convergence protocol (PDCP) configuration and allowed serving cell information for a logical channel configuration, wherein a PDCP entity of the UE is configured with a primary radio link control (RLC) entity associated with primary logical channel (P-LCH) and a secondary RLC entity associated with a secondary logical channel (S-LCH); and
 transmitting, to the UE, a media access control (MAC) control element (CE) including an indicator instructing activation or deactivation of a packet duplication,
 wherein in case that the indicator instructs the deactivation of the packet duplication, whether a carrier aggregation (CA) based packet duplication is configured or a dual connectivity (DC) based packet duplication is configured is identified at the UE:
  if the CA based packet duplication is configured, a packet is transmitted to the P-LCH, wherein the allowed serving cell information is not applied to determine serving cells, and
  if the DC based packet duplication is configured, the packet is transmitted to the P-LCH or S-LCH, and
 wherein in case that the indicator instructs the activation of the packet duplication, the packet duplication is performed and whether the CA based packet duplication is configured or the DC based packet duplication is configured is identified at the UE:
  if the CA based packet duplication is configured, the packet and a duplicated packet are transmitted to the P-LCH and the S-LCH associated with each allowed serving cell based on the allowed serving cell information, and
  if the DC based packet duplication is configured, the packet and the duplicated packet are transmitted to the P-LCH of a master cell group (MCG) and the S-LCH of a secondary cell group (SCG).

3. A user equipment in a wireless communication system, the user equipment comprising:
 a transceiver; and
 at least one controller coupled with the transceiver and configured to:
  receive, from a base station, a radio resource control (RRC) message including packet duplication information for a packet data convergence protocol (PDCP) configuration and allowed serving cell information for a logical channel configuration, wherein a PDCP entity is configured with a primary radio link control (RLC) entity associated with primary logical channel (P-LCH) and a secondary RLC entity associated with a secondary logical channel (S-LCH),
  receive, from the base station, a media access control (MAC) control element (CE) including an indication for instructing activation or deactivation of a packet duplication,
  in case that the indicator instructs the deactivation of the packet duplication, identify whether a carrier aggregation (CA) based packet duplication is configured or a dual connectivity (DC) based packet duplication is configured:
   if the CA based packet duplication is configured, transmit a packet to the P-LCH, wherein the allowed serving cell information is not applied to determine serving cells, and
   if the DC based packet duplication is configured, transmit the packet to the P-LCH or S-LCH, and
  in case that the indicator instructs the activation of the packet duplication, perform the packet duplication on the packet and identify whether the CA based packet duplication is configured or the DC based packet duplication is configured,
   if the CA based packet duplication is configured, transmit the packet and a duplicated packet to the P-LCH and the S-LCH associated with each allowed serving cell based on the allowed serving cell information, and
   if the DC based packet duplication is configured, transmit the packet and the duplicated packet to the P-LCH of a master cell group (MCG) and the S-LCH of a secondary cell group (SCG).

4. A base station in a wireless communication system, the base station comprising:
 a transceiver; and
 at least one controller configured to:
  transmit, to a user equipment (UE), a radio resource control (RRC) message including packet duplication information for a packet data convergence protocol (PDCP) configuration and allowed serving cell information for a logical channel configuration, wherein a PDCP entity of the UE is configured with a primary radio link control (RLC) entity associated with a primary logical channel (P-LCH) and a secondary RLC entity associated with a secondary logical channel (S-LCH), and
  transmit, to the UE, a media access control (MAC) control element (CE) including an indicator instructing activation or deactivation of a packet duplication,
 wherein in case that the indicator instructs the deactivation of the packet duplication, whether a carrier aggregation (CA) based packet duplication is configured or a dual connectivity (DC) based packet duplication is configured is identified at the UE:
  if the CA based packet duplication is configured, a packet is transmitted to the P-LCH, wherein the allowed serving cell information is not applied to determine serving cells, and
  if the DC based packet duplication is configured, the packet is transmitted to the P-LCH or S-LCH, and
 wherein in case that the indicator instructs the activation of the packet duplication, the packet duplication is performed and whether the CA based packet duplication is configured or the DC based packet duplication is configured is identified at the UE:
  if the CA based packet duplication is configured, the packet and a duplicated packet are transmitted to the P-LCH and the S-LCH associated with each allowed serving cell based on the allowed serving cell information, and
  if the DC based packet duplication is configured, the packet and the duplicated packet are transmitted to the P-LCH of a master cell group (MCG) and the S-LCH of a secondary cell group (SCG).

\* \* \* \* \*